(12) United States Patent
Wildeboer et al.

(10) Patent No.: US 8,867,823 B2
(45) Date of Patent: Oct. 21, 2014

(54) VIRTUAL VIEWPOINT IMAGE SYNTHESIZING METHOD AND VIRTUAL VIEWPOINT IMAGE SYNTHESIZING SYSTEM

(75) Inventors: Meindert Onno Wildeboer, Nagoya (JP); Lu Yang, Nagoya (JP); Mehrdad Panahpour Tehrani, Nagoya (JP); Tomohiro Yendo, Niigata (JP); Masayuki Tanimoto, Nagoya (JP)

(73) Assignee: National University Corporation Nagoya University, Nagoya-shi, Aichi-ken (JP)

( * ) Notice: Subject to any disclaimer, the term of this patent is extended or adjusted under 35 U.S.C. 154(b) by 351 days.

(21) Appl. No.: 13/309,979

(22) Filed: Dec. 2, 2011

(65) Prior Publication Data

US 2012/0141016 A1 Jun. 7, 2012

Related U.S. Application Data

(60) Provisional application No. 61/419,501, filed on Dec. 3, 2010.

(51) Int. Cl.
*G06K 9/00* (2006.01)
*G06T 15/00* (2011.01)
*H04N 13/02* (2006.01)
*H04N 13/00* (2006.01)

(52) U.S. Cl.
CPC ....... *H04N 13/0011* (2013.01); *H04N 13/0271* (2013.01)
USPC .............................. 382/154; 348/47; 345/419

(58) Field of Classification Search
USPC .............................. 382/154; 348/47; 345/419
See application file for complete search history.

(56) References Cited

U.S. PATENT DOCUMENTS

| 8,325,186 | B2 * | 12/2012 | Diamand | 345/426 |
|---|---|---|---|---|
| 8,355,565 | B1 * | 1/2013 | Yang et al. | 382/154 |
| 8,395,642 | B2 * | 3/2013 | Yea et al. | 345/647 |
| 8,643,701 | B2 * | 2/2014 | Nguyen et al. | 348/47 |
| 2002/0061131 | A1 * | 5/2002 | Sawhney et al. | 382/154 |
| 2007/0122027 | A1 * | 5/2007 | Kunita et al. | 382/154 |
| 2011/0148858 | A1 * | 6/2011 | Ni et al. | 345/419 |
| 2012/0027291 | A1 * | 2/2012 | Shimizu et al. | 382/154 |
| 2012/0039525 | A1 * | 2/2012 | Tian et al. | 382/154 |
| 2012/0200669 | A1 * | 8/2012 | Lai et al. | 348/43 |

OTHER PUBLICATIONS

"Depth-Image Based Rendering (DIBR), Compression and Transmission for a New Approach on 3D-TV"—by Christoph Fehn, Fraunhofer-Institut fur Nachrichtentechnik, Heinrich-Hertz-institut (HHI).

"View Scalable Multiview Video Coding Using 3-D Warping With Depth Map" by Shinya Shimizu, Masaki Kitahara, Hideaki Kimata, Kazuto Kamikura and Yoshiyuki Yashima, IEEE Transactions on Circuits and Systems for Video Technology, vol. 17, No. 11, Nov. 2007; pp. 1485-1495.

(Continued)

*Primary Examiner* — Kathleen Y Dulaney
(74) *Attorney, Agent, or Firm* — Davis & Bujold, PLLC; Michael J. Bujold

(57) ABSTRACT

Provided is a virtual viewpoint image synthesizing method in which a virtual viewpoint image viewed from a virtual viewpoint is synthesized based on image information obtained from a plurality of viewpoints. The virtual viewpoint image is synthesized through a reference images obtaining step, a depth maps generating step, an up-sampling step, a virtual viewpoint information obtaining step, and a virtual viewpoint image synthesizing step.

17 Claims, 19 Drawing Sheets

(56) References Cited

OTHER PUBLICATIONS

"Depth Reconstruction Filter and Down/Up Sampling for Depth Coding in 3-D Video"—by Kwan-Jung Oh, Sehoon Yea, Anthony Vetro and Yo-Sung Ho, IEEE Signal Processing Letters, vol. 16, No. 9, Sep. 2009; pp. 747-750.

"Intermediate View Interpolation Based on Multiview Video Plus Depth for Advanced 3D Video Systems"—by Aljoscha Smolic, Karsten Muller, Kristina Dix, Philipp Merkle, Peter Kauff and Thomas Wiegand, Image Processing Department Fraunhofer Institute for Telecommunications—Heinrich-Hertz-Institut; 2008; pp. 2448-2451.

"Reliability-Based Generation and View Synthesis in Layered Depth Video"—by Karsten Muller, Aljoscha Smolic, Kristina Dix, Peter Kauff and Thomas Wiegand, Image Processing Department Fraunhofer Institute for Telecommunications—Heinrich-Hertz-Institut; 2008;pp. 34-39.

"Boundary Filtering on Synthesized Views of 3D Video"—by Cheon Lee and Yo-Sung Ho, Gwangju Institute of Science and Technology—pp. 15-18; 2008.

* cited by examiner

VIRTUAL VIEWPOINT IMAGE SYNTHESIZING METHOD AND VIRTUAL VIEWPOINT IMAGE SYNTHESIZING SYSTEM

CROSS-REFERENCE TO RELATED APPLICATION

This application claims the benefit of U.S. Provisional Application No. 61/419,501, filed Dec. 3, 2010, the disclosures of which are incorporated herein by reference.

BACKGROUND

The present invention relates to a virtual viewpoint image synthesizing method and a virtual viewpoint image synthesizing system, in which a synthetic image viewed from a virtual viewpoint is obtained based on images captured at a plurality of locations.

A virtual viewpoint image is an image which appears as if captured by a real camera at a virtual location. For example, when an object and its background are captured by two cameras, an image is generated which appears as if captured from a position between the two real cameras. Such an image is referred to as the "virtual viewpoint image".

A process of generating the virtual viewpoint image is referred to as "rendering" or "view synthesis". Hereinafter, a "viewpoint image" refers to an image viewed from a specified viewpoint, and is either captured by an actual camera or generated through a process of view synthesis. Furthermore, the term "image" as used herein refers to a digital image composed of image pixels.

A human can perceive depth because it sees a different view with each eye. A basis of a state-of-the-art 3D video system (such as a 3D-TV or Free viewpoint TV) is to generate two viewpoint images, one for each eye. To provide freedom in viewpoint, many viewpoint images are needed. Information of a 3D scene can be obtained and represented in many ways.

A popular 3D scene representation is based on N-view and N-depth images, in which depth images represent scene geometry. FIG. 10 shows a generalized system diagram of a multi-viewpoint video system based on a plurality of views and geometry.

A plurality of color views are generally captured by a plurality of synchronized cameras. Geometry information can be represented by, for example, 3D models or per-pixel depth images. When a depth-image-based rendering is used, an unlimited number of virtual viewpoint images, which appear as if captured by actual cameras, can be synthesized within a given range (see Non-Patent Literature 1, for example).

The depth-image-based rendering is a virtual view synthesis process projecting image pixels of a given viewpoint image to another viewpoint image using a per-pixel depth value. This projection is generally referred to as 3D warping.

One of the advantages of N-view and N-depth representation is that a required processing at a receiver side is relatively low. Furthermore, a required transmission/storage bandwidth can be reduced. For example, if a 3D display requires 20 viewpoint images, it can be sufficient to transmit only two or three views and depth maps corresponding thereto, instead of transmitting 20 viewpoint images.

Generally, in multi-viewpoint video systems, a plurality of depth maps and views are compressed for storage or transmission. Efficient compression of both depth maps and views, and reliable high quality virtual view synthesis are important in such systems.

In a conventional approach to down-/up-sample the depth for compression, up-sampling methods have been used in which interpolated samples are estimated from only low-resolution depth maps (see Non-Patent Literatures 2 and 3, for example).

Non-Patent Literature 1: C. Fehn, "Depth-image-based rendering (DIBR), compression and transmission for a new approach on 3D-TV", Proc. SPIE Stereoscopic Displays and Virtual Reality Systems, XI, pp. 93-104 (January 2004)

Non-Patent Literature 2: S. Shimizu, M. Kitahara, H. Kimata, K. Kamikura, and Y. Yashima, "View scalable multiview video coding using 3-D warping with depth map", IEEE Transactions on Circuits and Systems for Video Technology, vol. 17, pp. 1485-1495, November 2007

Non-Patent Literature 3: K-J. Oh, S. Yea, A. Vetro, Y-S. Ho, "Depth Reconstruction Filter and Down/Up Sampling for Depth Coding in 3-D Video", IEEE signal processing letters, vol. 16, No. 9, September 2009, pp. 747-750

SUMMARY

However, applying the conventional up-sampling methods causes either strong blocking or smoothing effect in the up-sampled depth maps. This is a problem because it leads to undesired artifacts in the synthesized views.

In view of the above, it is desirable to provide a virtual image synthesis technique realizing an up-sampling method that causes neither blocking effect nor smoothing effect in the up-sampled depth maps at lower bitrates.

A first aspect of the present invention is a virtual viewpoint image synthesizing method, in which a virtual viewpoint image viewed from a virtual viewpoint is synthesized based on image information obtained from a plurality of viewpoints. The virtual viewpoint image synthesizing method includes a reference images obtaining step, a depth maps generating step, an up-sampling step, a virtual viewpoint information obtaining step, and a virtual viewpoint image synthesizing step. The reference images obtaining step is a step of obtaining reference images, which become references for the virtual viewpoint image, from a plurality of image obtaining devices disposed at the plurality of viewpoints. The depth maps generating step is a step of generating depth maps of images at the viewpoints at which the plurality of image obtaining devices are disposed by means of an image depths obtaining device that obtains depths of the images at the viewpoints at which the plurality of image obtaining devices are disposed. The up-sampling step is a step of up-sampling the depth maps generated in the depth maps generating step. The virtual viewpoint information obtaining step is a step of obtaining location information and direction information of the virtual viewpoint from a virtual viewpoint information obtaining device. The virtual viewpoint information obtaining device obtains the location information and the direction information of the virtual viewpoint. The direction information includes a direction in which the synthesized image is viewed from the virtual viewpoint. The virtual viewpoint image synthesizing step is a step of synthesizing the virtual viewpoint image, which corresponds to the location information and the direction information of the virtual viewpoint obtained in the virtual viewpoint information obtaining step. Such a synthesis is based on the reference images obtained in the reference images obtaining step, the depth maps up-sampled in the up-sampling step, and the location information and the direction information.

According to the virtual viewpoint image synthesizing method as above, neither strong blocking effect nor smoothing effect is caused in the up-sampled depth maps. In addition, artifacts are not created in the synthesized views. Therefore, the virtual viewpoint image synthesizing method contributes to increased coding efficiency and improved view synthesis quality.

In other words, in contrast with conventional up-sampling methods, the up-sampling method of the present invention reconstructs sharp object boundaries in the reconstructed depth maps by using high-resolution views. This results in both increased coding efficiency at lower bitrates and improved rendering quality because object edges are better preserved.

Accordingly, the up-sampling method which does not cause blocking effect or smoothing effect in the up-sampled depth maps can be achieved at lower bitrates.

A second aspect of the present invention is the virtual viewpoint image synthesizing method, in which the image depths obtaining device is a depth camera that detects a depth of an image, and in which the up-sampling step includes the steps of inputting the depth map input from the depth camera; associating a set of neighboring pixels in the depth map generated in the depth maps generating step with pixels not neighboring to each other in the reference image; assigning a weight to each pixel in the set of neighboring pixels in the depth map; optimizing the weight assigned to each pixel in the set of neighboring pixels; calculating a minimum weight; and selecting an optimal depth value in the set of neighboring pixels.

A third aspect of the present invention is the virtual viewpoint image synthesizing method, in which the weight is assigned based on color or intensity differences and distances between a pixel of the reference image and the set of neighboring pixels in the depth map.

A fourth aspect of the present invention is the virtual viewpoint image synthesizing method, in which the weight is assigned based on a combination of color or intensity differences and distances between a pixel of the depth map input from the depth camera and/or the reference image, and the set of neighboring pixels in the depth map input from the depth camera and/or the reference image.

A fifth aspect of the present invention is the virtual viewpoint image synthesizing method, in which optimization of the weight is performed by a winner-takes-all selection.

A sixth aspect of the present invention is the virtual viewpoint image synthesizing method, in which selection of the optimal depth value is performed by selecting a depth of a pixel with a lowest weight as an output depth value.

A seventh aspect of the present invention is a virtual viewpoint image synthesizing system, in which a virtual viewpoint image viewed from a virtual viewpoint is synthesized based on image information obtained from a plurality of viewpoints. The virtual viewpoint image synthesizing system includes a plurality of image obtaining devices, a reference images obtaining device, an image depths obtaining device, a depth maps generating device, an up-sampling device, a virtual viewpoint information obtaining device, and a virtual viewpoint image synthesizing device. The plurality of image obtaining devices are disposed at the plurality of viewpoints. The reference images obtaining device obtains reference images, which become references for image construction, from the plurality of image obtaining devices. The image depths obtaining device obtains depths of images at the viewpoints at which the plurality of image obtaining devices are disposed. The depth maps generating device generates depth maps of the images at the viewpoints at which the plurality of image obtaining devices are disposed based on the depths obtained by the image depths obtaining device. The up-sampling device up-samples the depth maps generated by the depth maps generating device. The virtual viewpoint information obtaining device obtains location information and direction information of the virtual viewpoint. The direction information includes a direction in which the synthesized image is viewed from the virtual viewpoint. The virtual viewpoint image synthesizing device synthesizes the virtual viewpoint image, which corresponds to the location information and the direction information of the virtual viewpoint obtained by the virtual viewpoint information obtaining device. Such a synthesis is based on the reference images obtained by the reference images obtaining device, the depth maps up-sampled by the up-sampling device, and the location information and the direction information.

According to the virtual viewpoint image synthesizing system as above, effects similar to those of the virtual viewpoint image synthesizing method of the first aspect of the present invention can be obtained.

An eighth aspect of the present invention is the virtual viewpoint image synthesizing system, in which the image depths obtaining device is a depth camera that detects a depth of an image, and in which the up-sampling device includes a depth map inputting device that inputs the depth map input from the depth camera; an associating device that associates a set of neighboring pixels in the depth map input by the depth map inputting device with pixels not neighboring to each other in the reference image; a weight assigning device that assigns a weight to each pixel in the set of neighboring pixels in the depth map; a minimum weight calculating device that optimizes the weight assigned to each pixel in the set of neighboring pixels by the weight assigning device and calculates a minimum weight; and an optimal depth value selecting device that selects an optimal depth value in the set of neighboring pixels.

A ninth aspect of the present invention is the virtual viewpoint image synthesizing system, in which the weight assigning device assigns the weight based on color or intensity differences and distances between a pixel of the reference image and the set of neighboring pixels in the depth map input by the depth map inputting device.

A tenth aspect of the present invention is the virtual viewpoint image synthesizing system, in which the weight assigning device assigns the weight based on a combination of color or intensity differences and distances between a pixel of the depth map input by the depth map inputting device and/or the reference image, and the set of neighboring pixels in the depth map input by the depth map inputting device and/or the reference image.

An eleventh aspect of the present invention is the virtual viewpoint image synthesizing system, in which the minimum weight calculating device optimizes the weight by a winner-takes-all selection.

A twelfth aspect of the present invention is the virtual viewpoint image synthesizing system, in which the optimal depth value selecting device selects a depth of a pixel with a lowest weight as an output depth value.

BRIEF DESCRIPTION OF THE DRAWINGS

Preferred embodiments of the present invention will be described below with reference to the accompanying drawings, in which.

DETAILED DESCRIPTION OF THE PREFERRED EMBODIMENTS

A description will be given below, with reference to the drawings, as to embodiments to which the present invention is applied. The embodiments of the present invention are not limited to those described below but can be modified into various forms within a technical scope of the present invention.

[First Embodiment]

Figure 1:
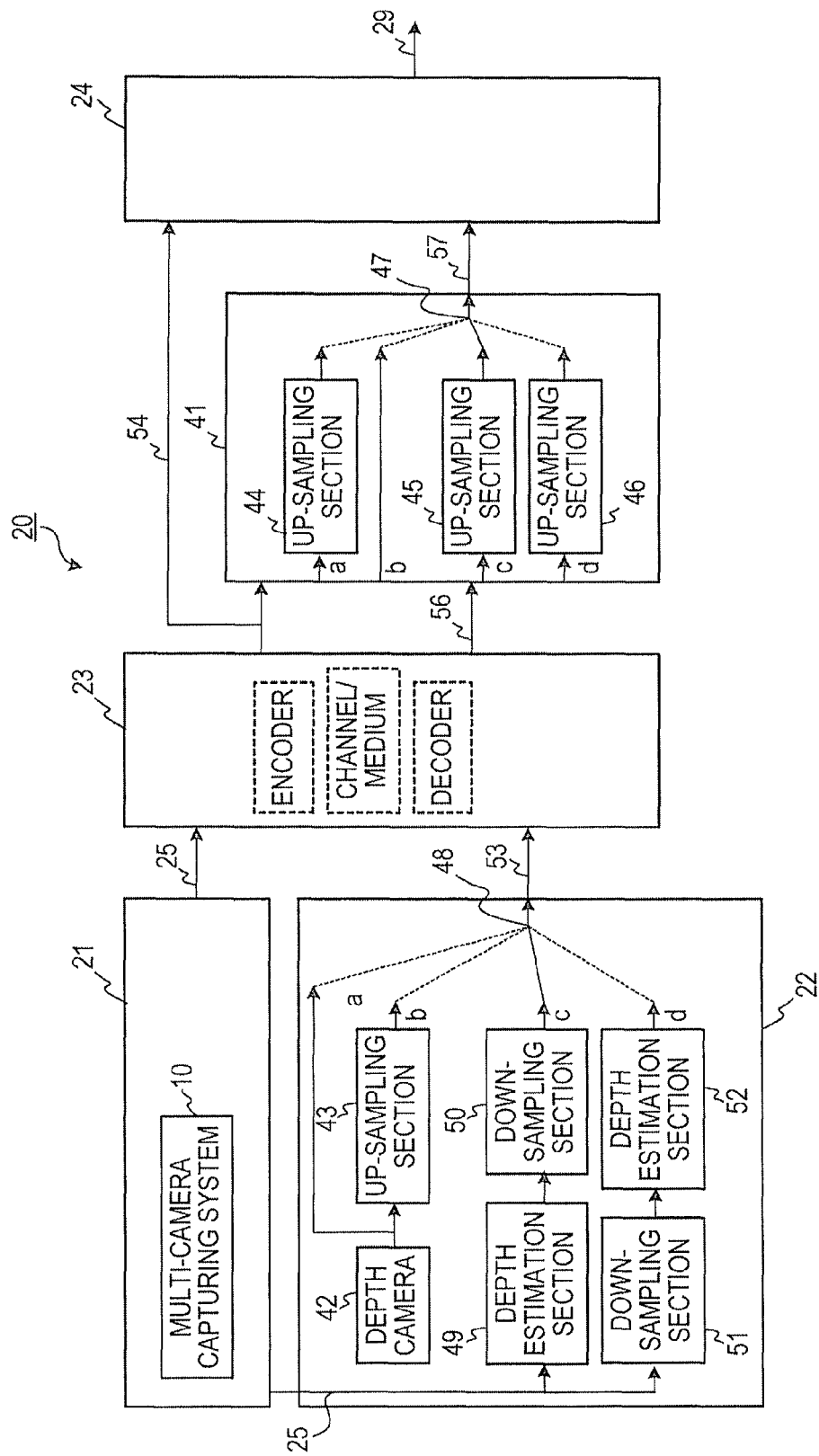
FIG. 1 is a system diagram of an exemplary 3D vision system based on N-view and N-depth.

FIG. 1 is a system diagram showing a generalized configuration of a virtual viewpoint image synthesizing system 20. As shown in FIG. 1, the virtual viewpoint image synthesizing system 20 includes a multi-viewpoint capture subsystem 21, a geometry generation subsystem 22, a transmission/storage subsystem 23, an up-sampling subsystem 41, and a virtual view synthesis subsystem 24.

In the geometry generation subsystem 22 and the up-sampling subsystem 41 of the present embodiment, there exist not only one processing path but different paths (hereinafter referred to as application paths), which can be followed in accordance with difference in application.

Specifically, any of four application paths 'a' through 'd' are selected by switching a switch 47 and a switch 48, and what is processed in the up-sampling subsystem 41 can be differentiated due to the difference in application.

The switches 47 and 48 always select the same path, that is, both are set to the application path 'a' or both are set to the application path 'b', for example.

The multi-viewpoint capture subsystem 21 includes a multi-camera capturing system 10 which obtains either static or dynamic images by means of a plurality of cameras (not shown).

The video images captured by the multi-camera capturing system 10 are pre-processed by calibration or rectification, and are output to the geometry generation subsystem 22 and the transmission/storage subsystem 23 as multi-viewpoint video images 25.

Since the calibration or rectification method in the multi-viewpoint capture subsystem 21 may be a conventional one, no explanation is given here.

The geometry generation subsystem 22 generates a depth map 53 and outputs the depth map 53 to the transmission/storage subsystem 23.

The depth map 53 is generated in four different manners (corresponding to the four application paths 'a' through 'd').

In the application path 'a', the depth image obtained by the depth camera 42 is output as the depth map 53 of the depth image.

In the application path 'b', the depth image obtained by the depth camera 42 is up-sampled by the up-sampling section 43 and output. This up-sampling will be described later in detail.

Here, the depth camera 42 used in the application paths 'a' and 'b' is a camera that can obtain images together with their depths, and obtains depths of the same images as the multi-viewpoint video images 25 captured by the multi-camera capturing system 10.

The depth map from the depth camera 42 generally has a resolution lower than that of the captured multi-viewpoint video images 25.

In the application path 'c', the depth map estimated by a depth estimation section 49 is generated from the multi-viewpoint video images 25 input from the multi-viewpoint capture subsystem 21, and the generated depth map is down-sampled by the down-sampling section 50 and output.

Thus, in the application path 'c', coding efficiency can be increased by down-sampling the high-resolution depth map from the depth estimation section 49.

Since the depth estimation in the depth estimation section 49 is complex, it is much faster to estimate a depth at lower resolution, to be followed by a less complex up-sampling method of the present invention. This application is useful in a case where a real-time depth estimation is required, although this comes with a cost of slightly reduced depth map quality.

In the down-sampling section 50 in the application path 'c', down-sampling by pixel dropping, which is defined by a following Equation 1, is performed in order to maintain depth boundaries during down-sampling.

Figure 2:
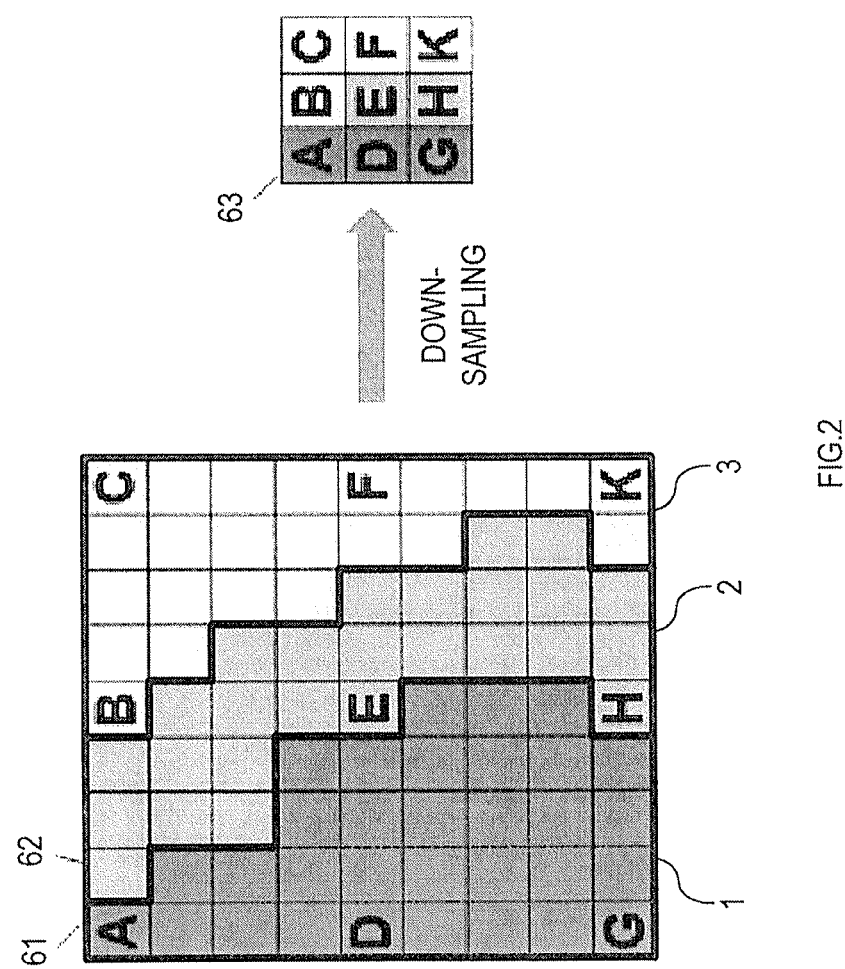
FIG. 2 is a schematic diagram of down-sampling.

[Equation 1]

$$\text{Depth}_{down}(x,y) = \text{Depth}_{in}(x \cdot \text{step}, y \cdot \text{step}) \quad (1)$$

wherein step represents a down-sampling factor, which is a parameter to be transmitted to a receiver side. FIG. 2 shows a schematic diagram of this down-sampling.

In this down-sampling, all samples on a regular grid are stored in the low-resolution depth map, and pixels off the grid are dropped. In FIG. 2, only the depth values of the pixels marked by letters A through K are stored in the down-sampled depth map, and the other depth values are discarded. For example, a pixel 61 is mapped to a pixel 63, whereas a pixel 62 is discarded.

In the application path 'd', the multi-viewpoint video images 25 input from the multi-viewpoint capture subsystem 21 are down-sampled by the down-sampling section 51. Then, a depth of the down-sampled multi-viewpoint video image is estimated by a depth estimation section 52, and the depth map is generated with the estimated depth and output.

In the virtual viewpoint image synthesizing system 20, information of a 3D scene can be represented in many ways. A popular 3D scene representation is based on N-view and N-depth map images. Examples of the N-view and N-depth map image, with N=3, which is obtained in the geometry generation subsystem 22, are shown in FIG. 3.

Figure 3:
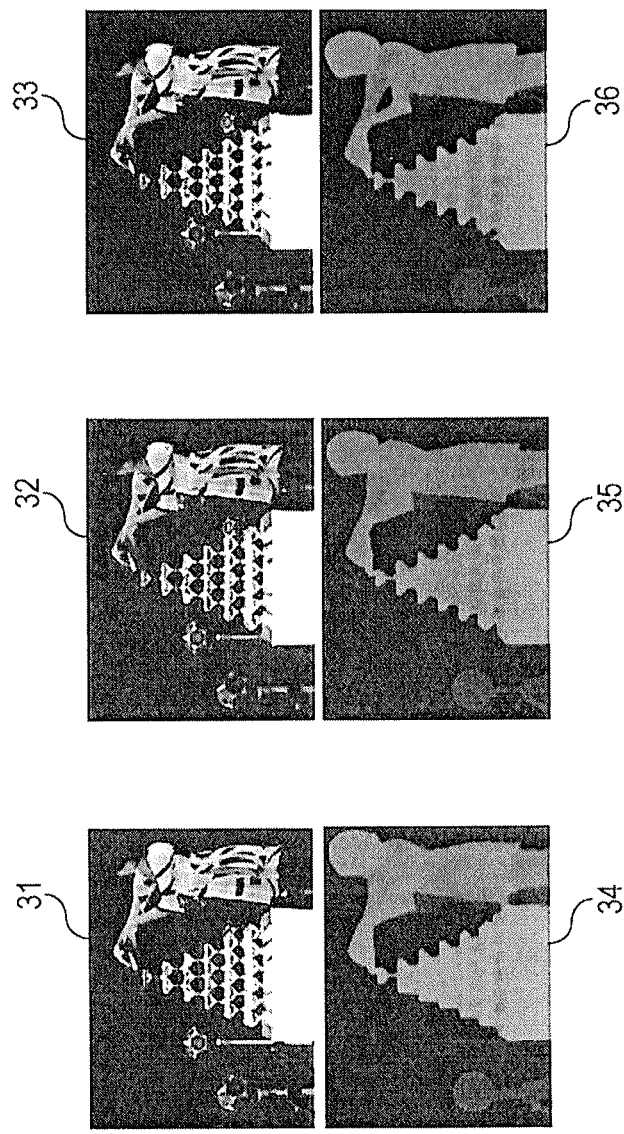
FIG. 3 is an example of three views and depth maps corresponding thereto.

FIG. 3 shows three depth views 31-33 and depth maps 34-36 corresponding thereto. The three depth views 31-33 are captured by three depth cameras 42 (see FIG. 1) placed next to each other.

The depth maps 34-36 are gray-scale images representing per-pixel depth relative to the depth camera 42 within a predetermined depth range. In an 8-bit scale, the gray-scale value 0 (black) represents a maximum distance, and 255 (white) represents a minimum distance.

Depth maps 34-36 tend to contain smoothly changing intensity within objects and sharp changes at object edges (see FIG. 3, for example). Therefore, the depth maps 34-36 tend to have more spatial redundancy compared to texture video, which can be exploited by down-sampling and up-sampling the depth.

Depth maps 34-36 include important edge information around object boundaries. Conventional up-sampling methods, such as nearest neighbor, linear interpolation, or polynomial interpolation, smooth or filter out this important information. This leads to artifacts in the synthesized views.

The transmission/storage subsystem 23 stores or transmits the multi-viewpoint video images 25 and the depth maps 53. In the transmission/storage subsystem 23, the multi-viewpoint video images 25 and the depth maps 53 may or may not be compressed, and a channel may simply be a wire.

Accordingly, decoded views 54 and decoded depth maps 56 output from the transmission/storage subsystem 23 may be exactly the same as the multi-viewpoint video images 25 and the depth maps 53, respectively.

To compress the multi-viewpoint video images 25 and the depth maps 53, any standard state-of-the-art video encoder, for example AVC/H.264, MVC, MPEG2, MJPEG etc., may be used.

The up-sampling subsystem 41 includes the switch 47, up-sampling sections 44-46, and a wire. The switch 47 is a switch that selects the application path as described above. The wire is used to output an input from the transmission/storage subsystem 23 directly to the virtual view synthesis subsystem 24 via the switch 47.

The up-sampling section 46 can be used for an application depicted by the application path 'd', in which the real-time depth estimation is required. The multi-viewpoint video images 25 are down-sampled by the down-sampling section 51, and the depth is estimated at a lower resolution by the depth estimation section 52, to be followed by use of the up-sampling section 46.

Here, a description will be given as to the up-sampling sections 44-46 in the up-sampling subsystem 41 and the up-sampling section 43 in the geometry generation subsystem 22 with reference to FIGS. 4-8.

Figure 4:
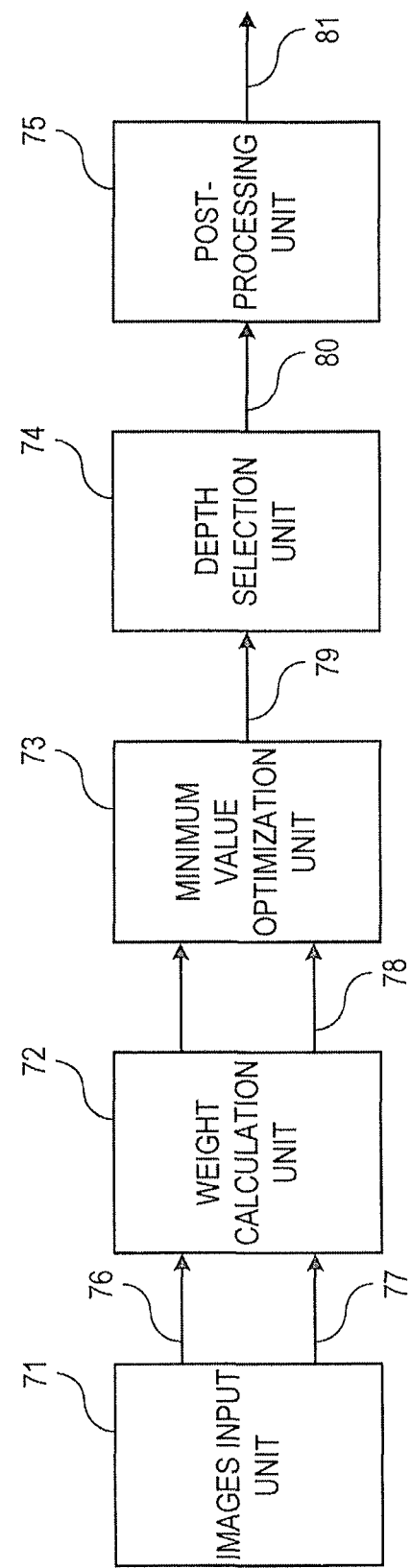
FIG. 4 is a diagram showing a generalized inner configuration of an up-sampling section.

FIG. 4 is a diagram showing a generalized inner configuration of the up-sampling sections 43-46. Each of the up-sampling sections 43-46 includes an images input unit 71, a weight calculation unit 72, a minimum value optimization unit 73, a depth selection unit 74, and a post-processing unit 75 as shown in FIG. 4.

Out of a set of the multi-viewpoint video images 25 and the depth maps 53, the images input unit 71 selects an input view 76 and a depth map 77 corresponding thereto.

For each pixel u which needs up-sampling, the weight calculation unit 72 calculates a set of weights 78 based on color or luminance difference and distance between the pixel u and the set of neighboring pixels.

The minimum value optimization unit 73 selects a pixel with the lowest weight 79, and an output depth map 80 corresponding thereto is selected by the depth selection unit 74.

Optionally, the post-processing unit 75 may perform post-processing operations such as filtering (e.g., median filtering) to generate an output depth 81.

Figure 5:
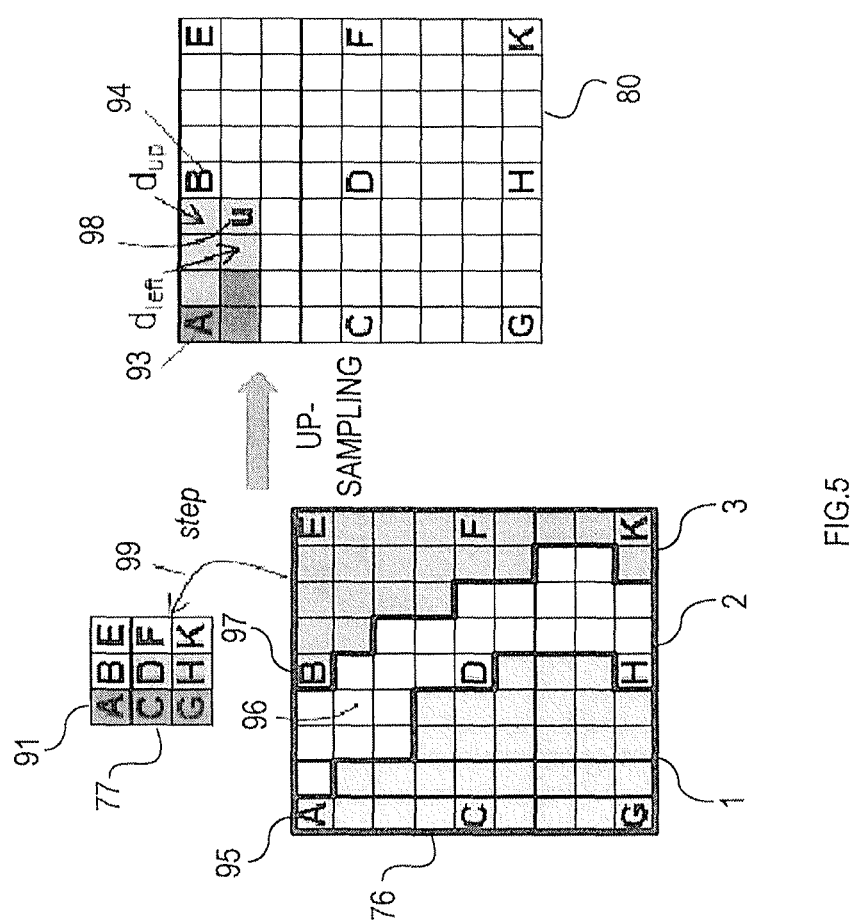
FIG. 5 is a schematic diagram of up-sampling in the up-sampling section.

FIG. 5 is a schematic diagram of up-sampling in the up-sampling sections 43-46. An input image includes the full-resolution input view 76 (corresponding to the multi-viewpoint video image 25 in the up-sampling section 43) and the low-resolution depth map 77 (corresponding to the depth map 53 in the up-sampling section 43) corresponding to the full-resolution input view 76. A scaling factor between a sample grid of the input view 76 and a sample grid of the depth map 77 is defined by a parameter step 99.

'A' as a pixel 91 in the depth map 77 corresponds to 'A' as a pixel 95 in the input view 76, and a depth value of the pixel 91 is copied to a pixel 93 in the output depth map 80. For pixels in the output depth map 80 which have no value defined in the depth map 77, for example, for 'u' as a pixel 98 in the output depth map 80, a depth is estimated from its neighboring pixels.

A set of neighboring pixels N is predefined. As an example, N consists of four neighboring pixels labeled as A, B, C and D in the input view 76 in FIG. 5, and is defined by a following Equation 2:

[Equation 2]

$$N \in \{A,B,C,D\} \qquad (2)$$

Then, for each neighboring pixel in the set N, a weight is calculated by following Equations 3-5 based on a color difference and pixel distance between the pixel u and the neighboring pixel in the set N.

[Equation 3]

$$W_N(u) = f(u,N)g(u,N) \qquad (3)$$

[Equation 4]

$$f(u,N) = \|u - N\| \qquad (4)$$

[Equation 5]

$$g(u,N) = \|C_u - C_N\| \qquad (5)$$

wherein function f( ) is the pixel distance, and function g( ) is the color difference between the pixel u and the neighboring pixel in the set N. $C_u$ represents a color of the pixel u, and $C_N$ represents a color of the pixel in the set N.

Here, "|| ||" may be any norm (e.g., L1 or L2 norm), and a color space C may be any space (e.g., RGB, YUV, HSI, grayscale etc.).

Additionally, a smoothing term may be added to Equation 3, for example as in Equations 6 and 7, to reduce noise around boundaries.

[Equation 6]

$$W_N(u) = f(u,N)g(u,N) + V_N \qquad (6)$$

[Equation 7]

$$V_N = \lambda_1 |d_N - d_{left}| + \lambda_2 |d_N - d_{up}| \quad (7)$$

wherein $\lambda_1$ and $\lambda_2$ are parameters controlling a strength of the smoothing term, $d_N$ is the depth of the pixel in the set N, $d_{left}$ is the depth value of a pixel at the left of the pixel u, and $d_{up}$ is the depth value of a pixel above the pixel u.

The depth value of the output depth of the pixel 98 'u' is determined by optimizing $W_N(u)$ in Equation 3 or Equation 6 to select a winning depth as in a following Equation 8.

[Equation 8]

$$depth_u = \arg\min(W_N(u)) \quad (8)$$

(Up-Sampling Processing)

Figure 6:
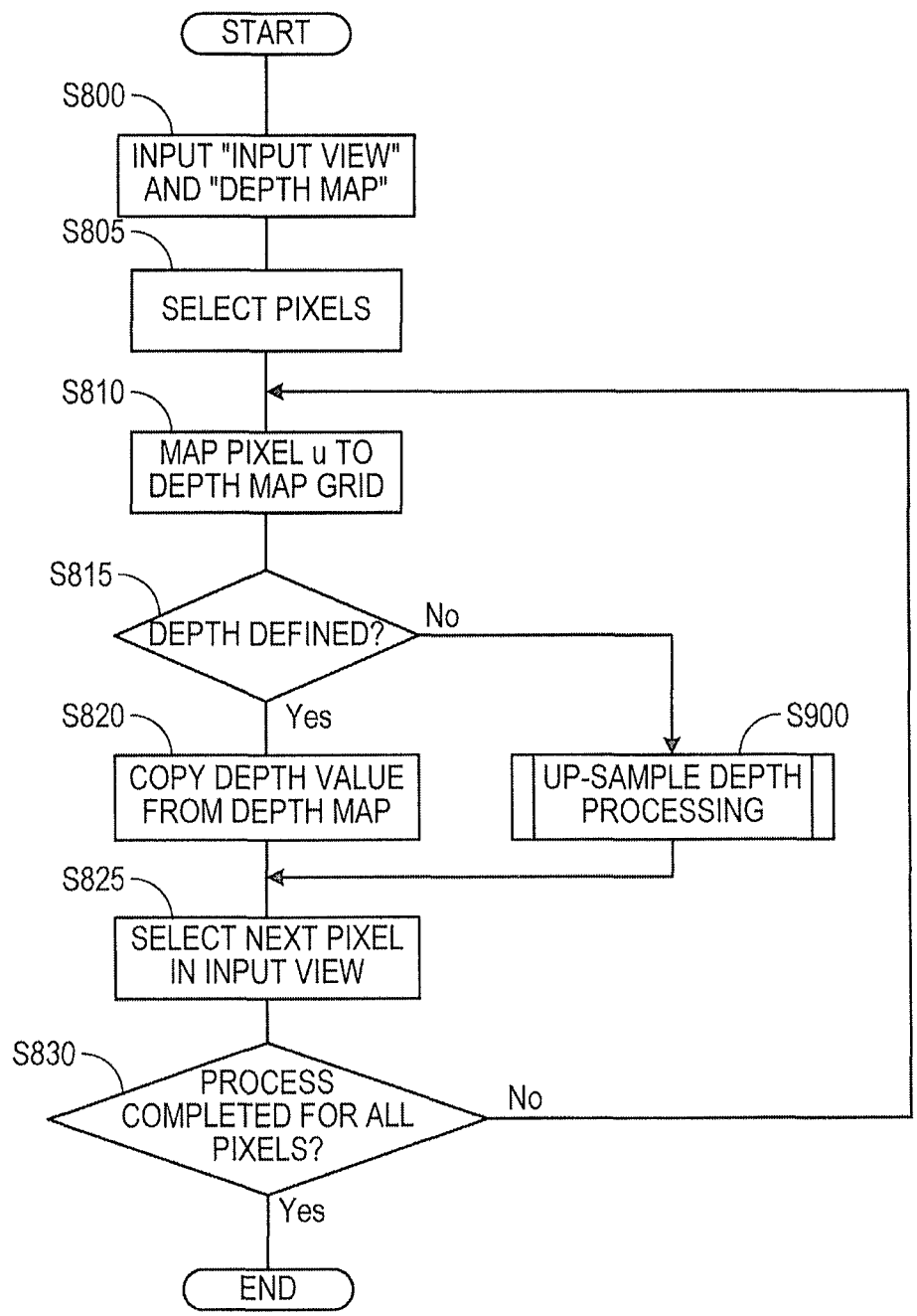
FIG. 6 is a flowchart showing a flow of an up-sampling processing.
Figure 7:
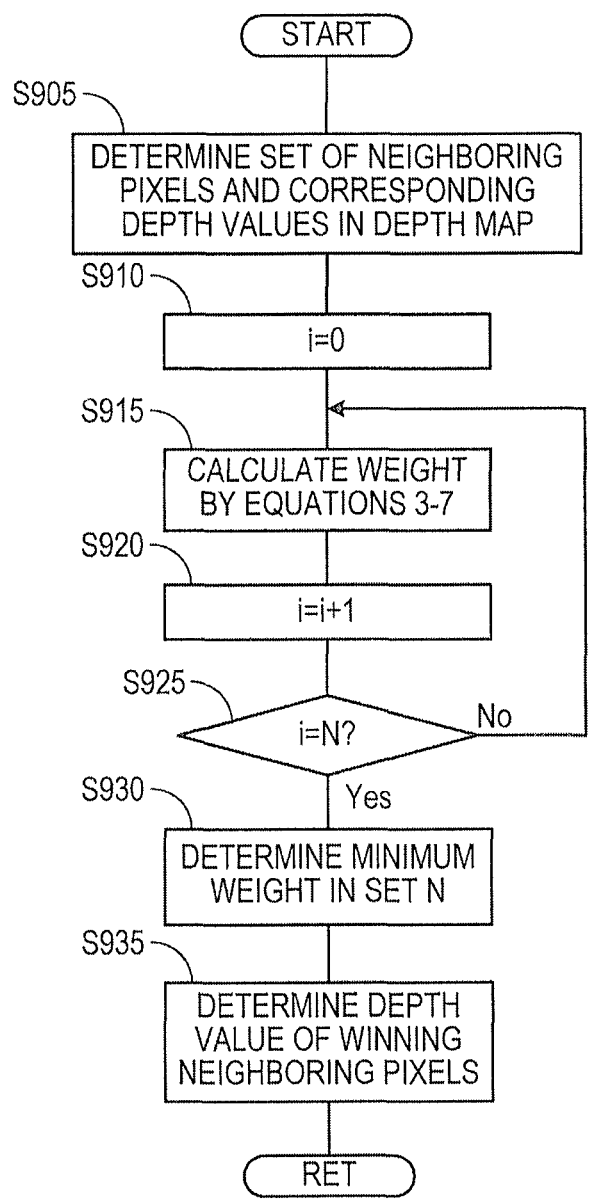
FIG. 7 is a flowchart showing a flow of an up-sample depth processing, which is a subroutine during the up-sampling processing.

Next, a description will be given as to an up-sampling processing in a case where a processing in each of the units 71-75 of the up-sampling sections 43-46 is performed by a CPU. FIG. 6 is a flowchart showing a flow of the up-sampling processing, and FIG. 7 is a flowchart showing a flow of an up-sample depth processing, which is a subroutine during the up-sampling processing.

As shown in FIG. 6, in the up-sampling processing, the input view 76 and the depth map 77 are input in a step S800.

In a following step S805, the pixel 95 located at a top left corner in the input view 76 in FIG. 5 is selected. Subsequently, pixels are selected in a conventional scanning order (raster scanning), starting at the top left corner and ending at a right bottom corner.

In a following step S810, a location of the pixel u in the input view 76 is mapped to a lower-resolution grid of depth of 'A' as the pixel 91.

In a following step S815, it is determined whether a depth value of the pixel 91 is defined at that location. If the depth value of the pixel 91 is defined at that location (S815:Yes), the process proceeds to a step S820. If the depth value of the pixel 91 is not defined (S815: No), the process proceeds to an up-sample depth processing step S900.

In S820, the depth value of the pixel 91 is copied from the depth map. If the depth value is not defined (S815: No), the depth value is determined in S900, which will be described later.

Subsequently in a step S825, the next pixel u in the input view 76 is selected, and in a following step S830, it is determined whether the processings of S810-S825 have been completed or not for all pixels in the input view 76.

If it is determined that the processings of S810-S825 have not been completed yet for all pixels (S830: No), the process is returned to S810 and the processings of S810-S825 are performed for all pixels. If it is determined that the processings of S810-S825 have been completed for all pixels (S830: Yes), this process is terminated.

An output of this processing is the up-sampled output depth map 80.

Next, a description will be give as to the up-sample depth processing in S900 with reference to FIG. 7. As shown in FIG. 7, in the up-sample depth processing, the set of neighboring pixels N and depth values corresponding thereto in the depth map 77 are determined in a step S905.

Subsequently in steps S910-S925, the weights are calculated for all pixels (i=0-N) using the foregoing Equations 3-7.

Then, a minimum weight in the set N is determined in a step S930, and a depth value of winning neighboring pixel is determined in a step S935.

In the up-sampling method as above based on the input view 76 in the up-sampling sections 43-46, sharp object boundaries can be maintained and reconstructed. This is because, when a low-resolution depth map is up-sampled, high-resolution color view image corresponding thereto is used.

Figure 8A:
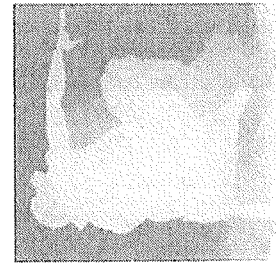
FIGS. 8A-8D show results of the up-sampling in the up-sampling section.

FIGS. 8A-8D show results of the up-sampling. FIG. 8A shows an original depth map. The original depth is down-sampled and then up-sampled with two conventional methods and the method of the present invention.

Figure 8B:
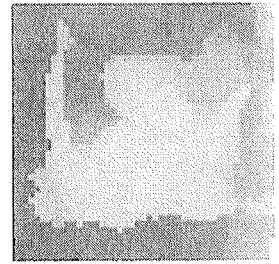
Figure 8C:
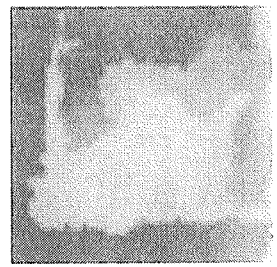
Figure 8D:
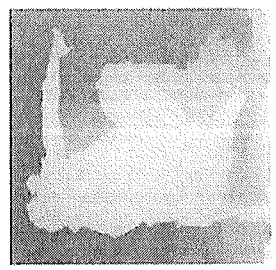

FIG. 8B shows a result of a conventional nearest neighbor up-sampling. FIG. 8C shows a result of a conventional bilinear up-sampling. FIG. 8D is an output image of the up-sampling sections 43-46, which clearly shows less smoothing and blocking and better reconstructed object edges.

In the virtual view synthesis subsystem 24, a virtual viewpoint image corresponding to virtual viewpoint information is synthesized based on a plurality of reference images obtained by the geometry generation subsystem 22, the depth map up-sampled by the up-sampling subsystem 41, and location information and direction information of each camera that constitutes the multi-camera capturing system 10. Then, the synthesized virtual viewpoint image is output as virtual view 29.

Here, in all the application paths ('a' through 'd'), an input to the up-sampling sections 43-46 is a view image and a depth map corresponding thereto at a resolution lower than that of the view image. Reconstructed depth maps 57 and the decoded views 54 are used in the virtual view synthesis subsystem 24 to render novel views.

(Features of the Virtual Viewpoint Image Synthesizing System 20)

According to the virtual viewpoint image synthesizing system 20 as described above, neither strong blocking effect nor smoothing effect is caused in the up-sampled depth maps, and artifacts are not created in the synthesized view. Therefore, the virtual viewpoint image synthesizing system 20 contributes to increased coding efficiency and improved view synthesis quality.

Specifically, in contrast with conventional up-sampling, the up-sampling method of the virtual viewpoint image synthesizing system 20 reconstructs sharp object boundaries in the reconstructed depth map by using a high-resolution view. This results in both increased coding efficiency at lower bitrates and improved rendering quality because object edges are better preserved.

Accordingly, the up-sampling method which does not cause blocking effect or smoothing effect in the up-sampled depth maps can be achieved at lower bitrates.

Figure 9:
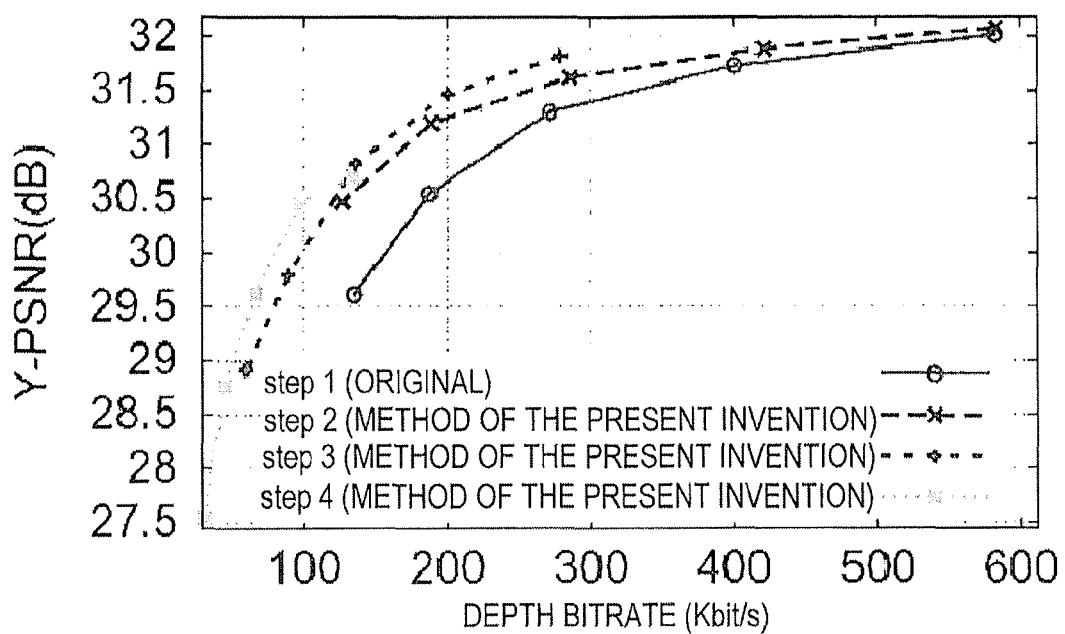
FIG. 9 is a PSNR comparison on video sequence "Champagne_tower"
Figure 10:
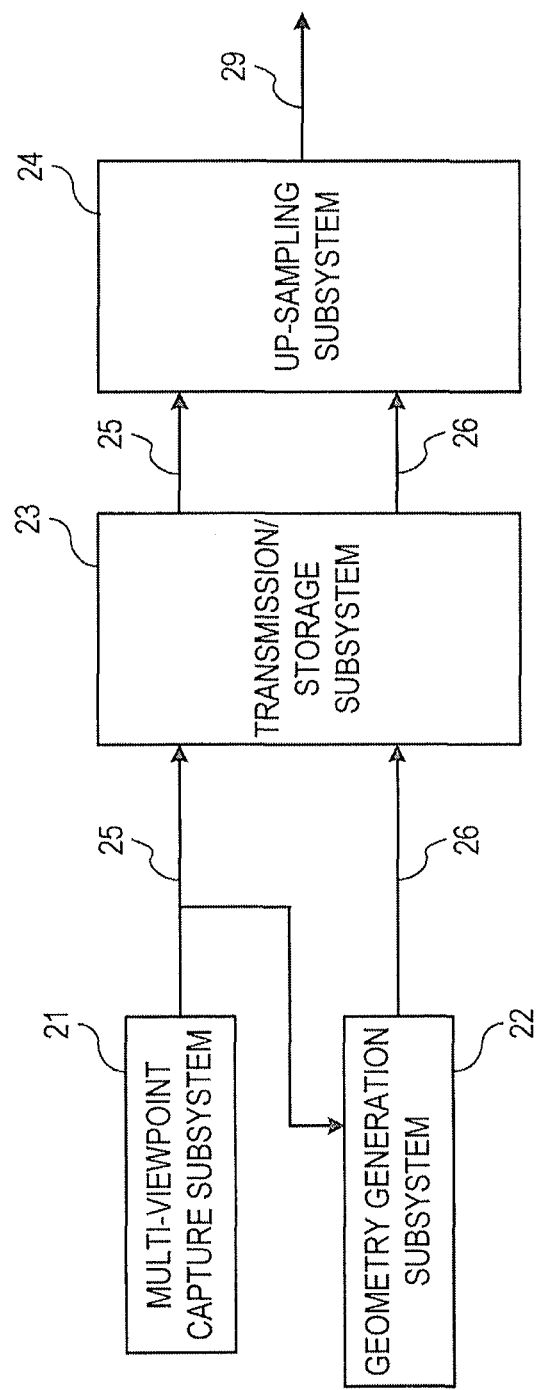
FIG. 10 is a generalized system diagram of a multi-viewpoint video system based on a plurality of views and geometry.

Here, as an evidence of advantage of the method of the present invention, a PSNR comparison on video sequence "Champagne_tower" is shown in FIG. 9.

[Second Embodiment]

A description will be given as to a second embodiment.

Figure 11:
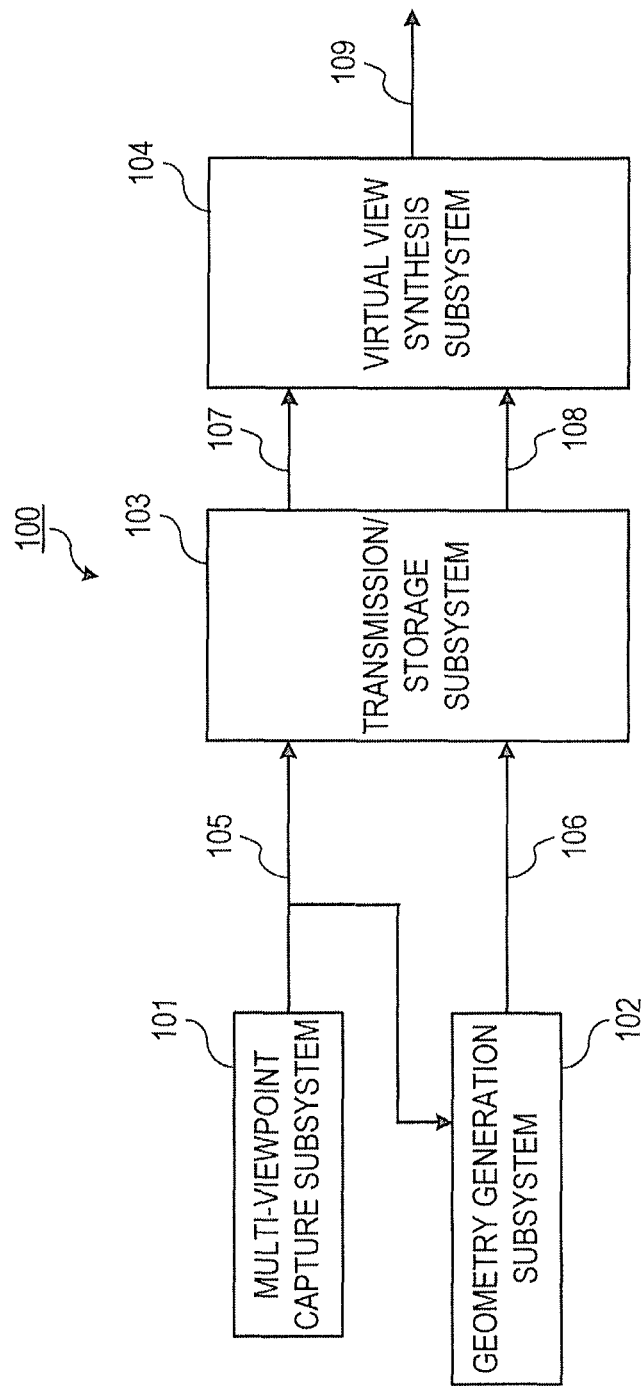
FIG. 11 is a generalized system diagram of a multi-viewpoint image synthesis system based on a plurality of views and geometry.

FIG. 11 is a system diagram showing a generalized configuration of a multi-viewpoint image synthesizing system 100. As shown in FIG. 11, the multi-viewpoint image synthesizing system 100 includes a multi-viewpoint capture subsystem 101, a geometry generation subsystem 102, a transmission/storage subsystem 103, and a virtual view synthesis subsystem 104.

The multi-viewpoint capture subsystem 101 includes a multi-camera capturing system which obtains either static or dynamic images by means of a plurality of cameras (not shown). The cameras constituting the multi-camera capturing system can capture mono-modal or multi-modal video images.

The video images captured by the multi-camera capturing system are pre-processed by calibration or rectification, and will be output to the geometry generation subsystem 102 and the transmission/storage subsystem 103 as multi-viewpoint images 105.

Since a calibration or rectification method in the multi-viewpoint capture subsystem 101 may be a conventional one, no explanation is given here.

The geometry generation subsystem 102 generates geometry information 106 using the multi-viewpoint images 105. In the geometry generation subsystem 102, point cloud geometry information or 3D geometry information is estimated by stereo or 3D reconstruction.

The geometry information 106 generated by the geometry generation subsystem 102 may contain errors caused by imperfect geometry generation.

In the transmission/storage subsystem 103, the multi-viewpoint images 105 generated by the multi-viewpoint capture subsystem 101 and the geometry information 106 generated by the geometry generation subsystem 102 are compressed or coded if needed, and are transmitted to the virtual view synthesis subsystem 104 as reference images 107 and geometry information 108. In such a case, the compression or coding leads to additional transmission noises.

As outputs of the transmission/storage subsystem 103, both the transmitted reference images 107 and geometry information 108 contain inevitable errors, which come from original capturing by the multi-viewpoint capture subsystem 101, geometry extraction by the geometry generation subsystem 102, and transmission by the transmission/storage subsystem 103.

Figure 12:
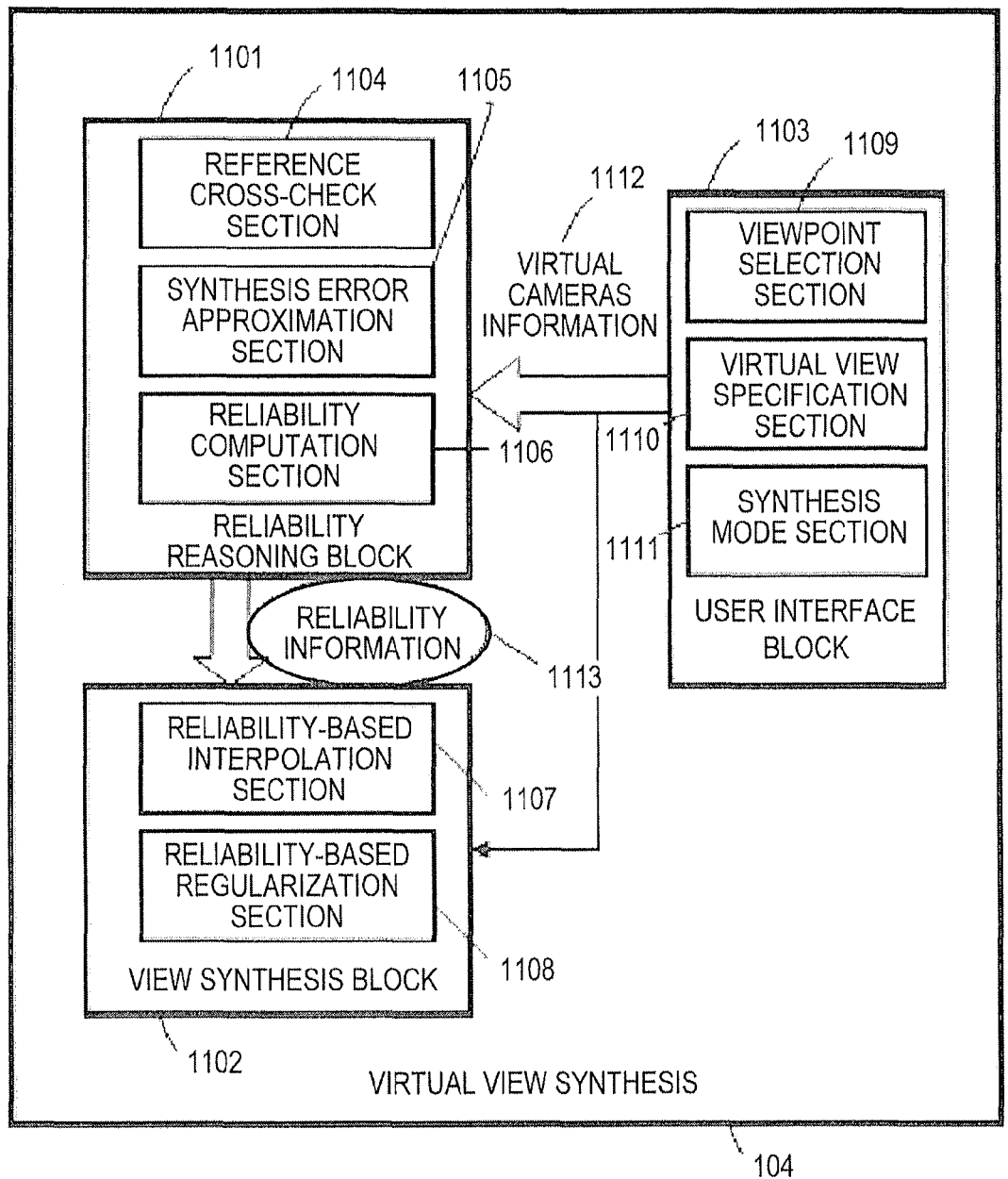
FIG. 12 is a block diagram showing a generalized configuration of a virtual view synthesis subsystem.

Next, a description will be given as to details of the virtual view synthesis subsystem 104 with reference to FIG. 12. FIG. 12 is a block diagram showing a generalized configuration of the virtual view synthesis subsystem 104.

The virtual view synthesis subsystem 104 includes three sub-blocks: a user interface block 1103, a reliability reasoning block 1101, and a view synthesis block 1102.

The user interface block 1103 receives predetermined virtual viewpoint instructions from either real users or virtual proxies. A virtual viewpoint is selected by a viewpoint selection section 1109.

Relative virtual views are specified in a virtual view specification section 1110. A synthesis mode section 1111 represents an application type, which provides prior information on the viewpoint selection section 1109 and the virtual view specification section 1110. Required virtual cameras information 1112 is sent to the reliability reasoning block 1101.

A reference cross-check in a reference cross-check section 1104 is implemented by warping the reference images 107 using the geometry information 108 to different reference viewpoints which are close to virtual cameras information 1112.

Figure 13:
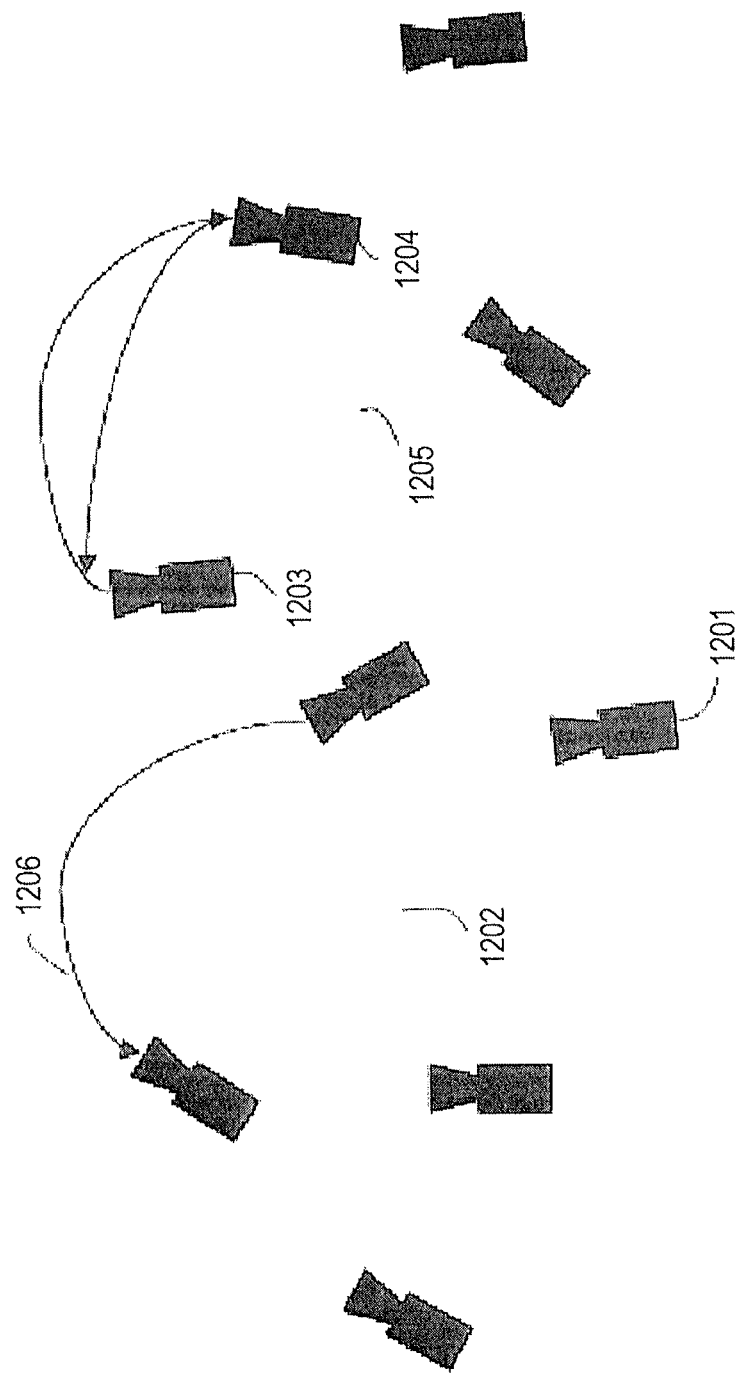
FIG. 13 is a diagram exemplifying a reference cross-check process.

Here, an example of a process of reference cross-check is shown in FIG. 13. Cameras 1201 and 1203, and an anchor reference camera 1204 are reference cameras for the reference images 107 (see FIG. 11).

Virtual cameras 1202 and 1205 are decided by the virtual cameras information 1112 (see FIG. 12).

To cross-check the camera 1203 for the virtual camera 1205, the camera 1203 is warped to the anchor reference camera 1204, which is the closest camera to the virtual camera 1205.

The anchor reference camera 1204 is cross-checked by the camera 1203, which is the second closest camera to the virtual camera 1205. Other cross-checks 1206 are done similarly for each reference camera with respect to each virtual view.

3D warping is implemented by projecting a pixel in a reference view to a 3D space using the geometry information 108 (see FIG. 11), followed by projecting the projected pixel to a target camera.

Figure 14:
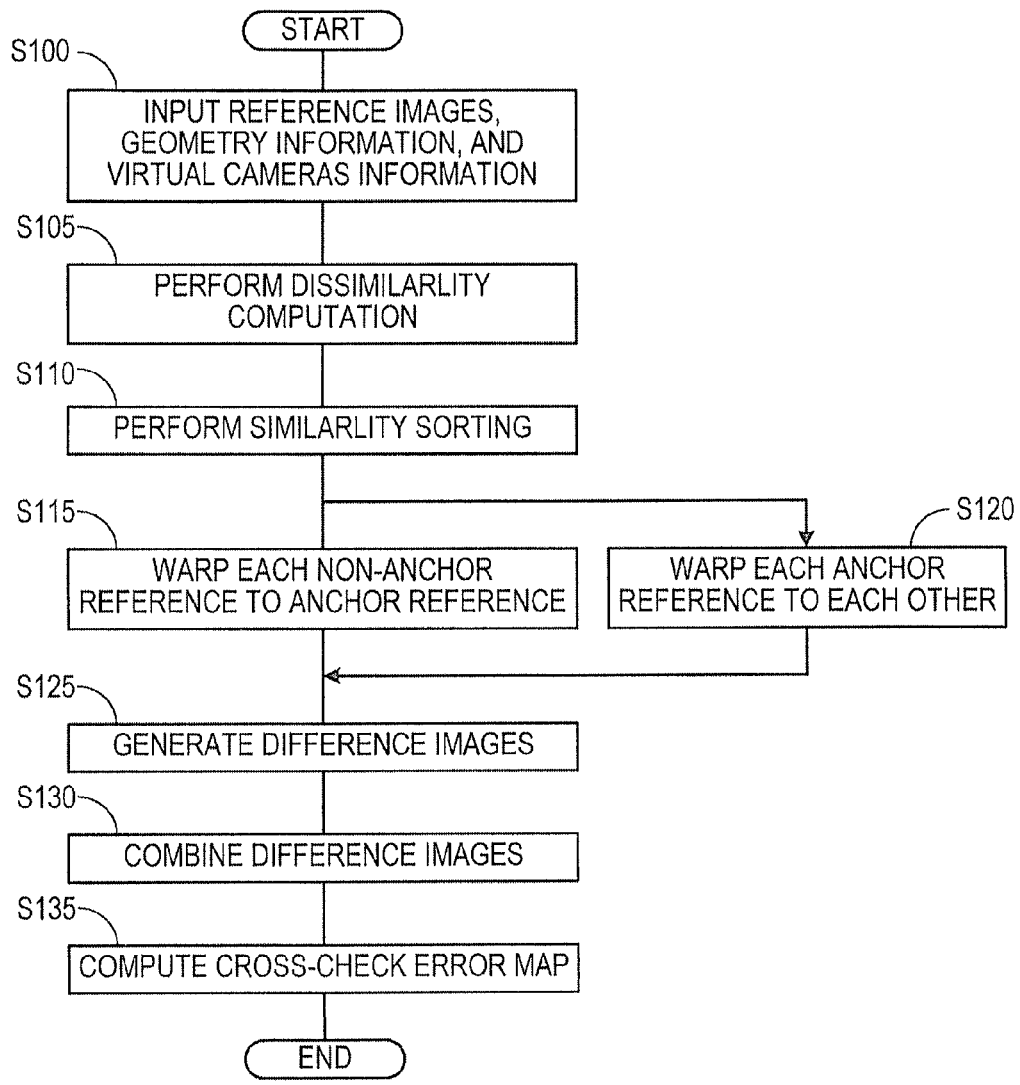
FIG. 14 is a flowchart showing a flow of a reference cross-check processing performed in a reference cross-check section.

Next, a description will be given, with reference to FIG. 14, as to a reference cross-check processing performed in the reference cross-check section 1104. FIG. 14 is a flowchart showing a flow of the reference cross-check processing.

In the reference cross-check processing, the reference images 107, the geometry information 108, and the virtual cameras information 1112 are input in a step S100.

In a following step S105, dissimilarity computation is performed based on the reference images 107, the geometry information 108, and the virtual cameras information 1112 input in S100. Specifically, a dissimilarity $S_{RV}$ between a reference viewpoint R and a virtual viewpoint V can be decided by a distance therebetween in a camera parameter space C: $S_{RV}=\| C_R - C_V \|$, wherein $C_R$ and $C_V$ are camera parameters of the reference viewpoint R and the virtual viewpoint V, respectively. "$\| \ \|$" may be any norm.

In a following step S110, a similarity sorting processing is performed. Specifically, similarity sorting is performed based on the dissimilarity $S_{RV}$ between the reference viewpoint R and the virtual viewpoint V, which is computed in S105. In other words, anchor references which have the smallest $S_{RV}$ are defined as the closest references to virtual views.

In steps S115 and S120, warping processing is performed. The warping processing in S115 and S120 is based on the reference images 107 with geometry information thereof. Multi-warping can be employed in S115 and S120 if the anchor references exist plurally in S110.

In a following step S125, difference images between warped references and the anchor references are generated.

In a following step S130, the difference images generated in S125 are combined. Subsequently in a step S135 a unique cross-check error map for each reference with respect to each virtual viewpoint is computed.

The cross-check error map computed in S135 can be used to approximate potential synthesis errors corresponding to each of the input reference images 107 with geometry information thereof.

A synthesis error approximation section 1105 (see FIG. 12) is efficiently implemented by projecting the original cross-check error map obtained in the reference cross-check section 1104 to virtual viewpoint V. Estimated potential synthesis errors may be adjusted based on baselines between the reference viewpoint R and the virtual viewpoint V.

Figure 15:
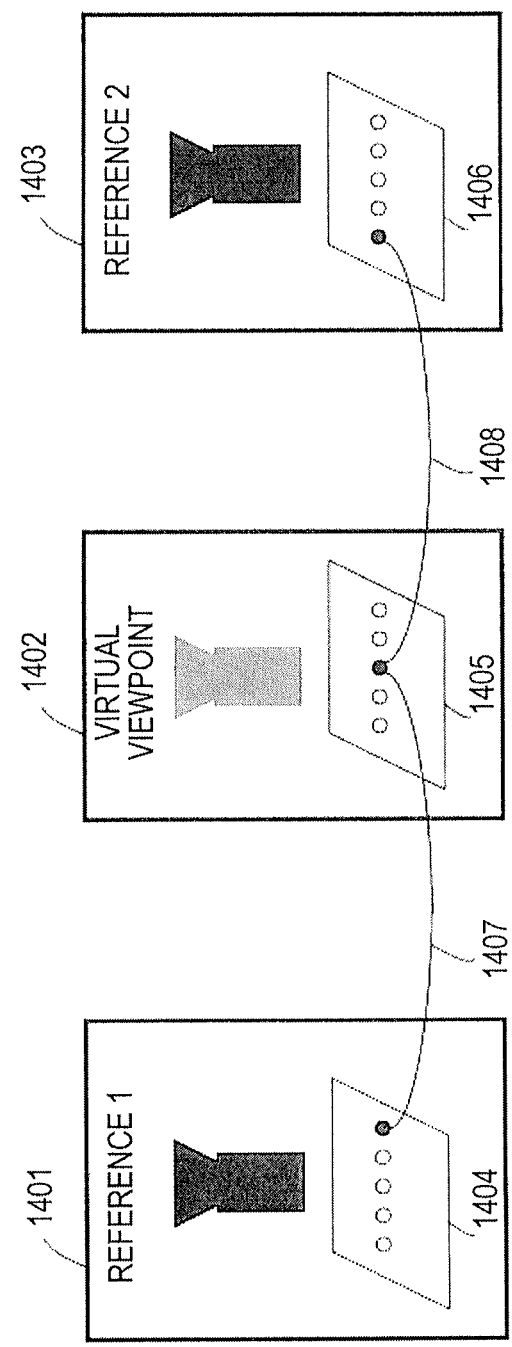
FIG. 15 is a diagram showing a simulation of different viewpoints via views and geometry information corresponding to the different viewpoints.
Figure 16:
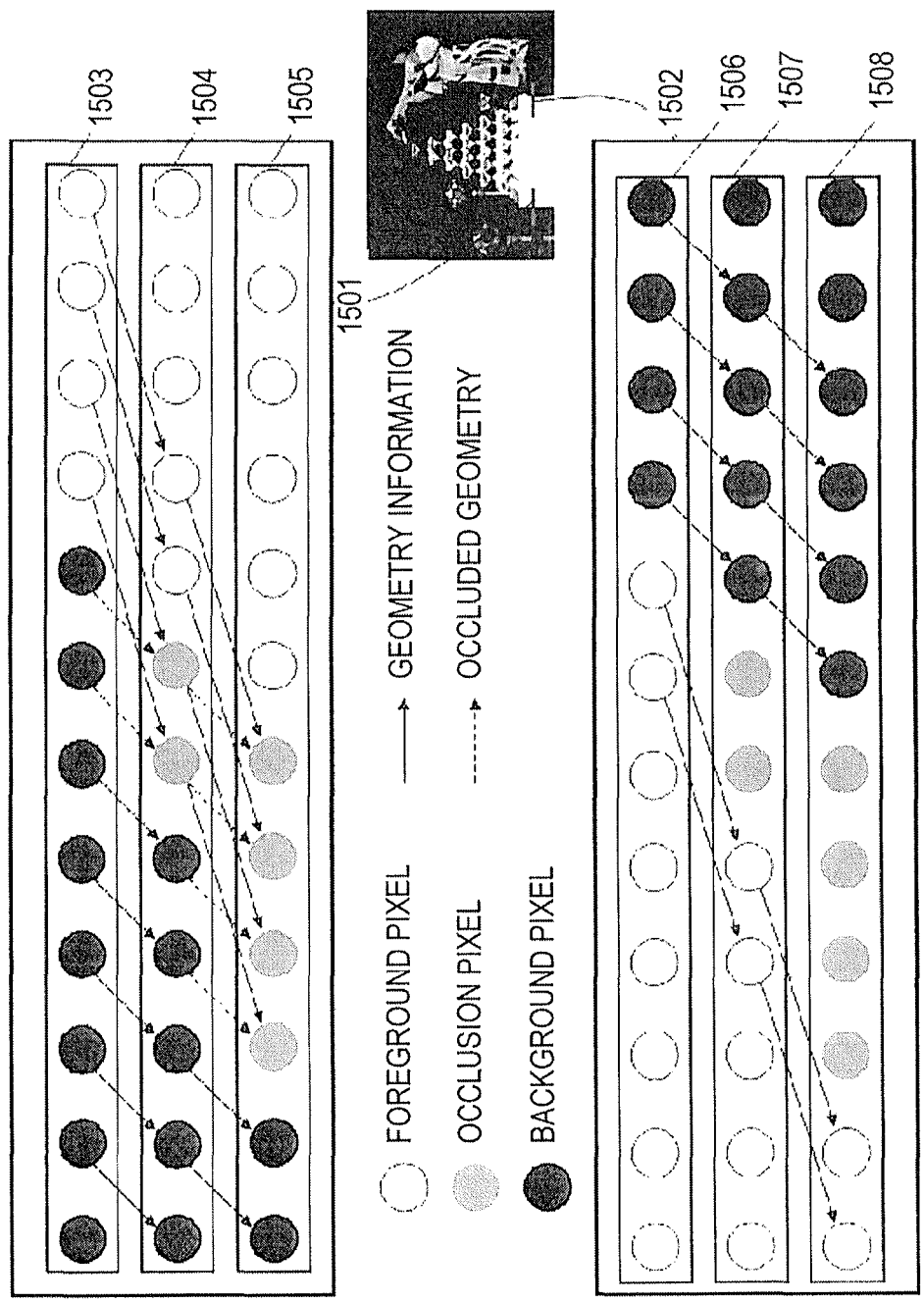
FIG. 16 is a diagram showing results of a simulation of boundary areas in different viewpoints.

Here, a description will be given as to details of a reference cross-check method with reference to FIGS. 15 and 16. FIG. 15 is a diagram showing a simulation of different viewpoints 1401, 1402, and 1403 via views 1404, 1405, and 1406 corresponding thereto, respectively and geometry information 1407 and 1408. FIG. 16 is a diagram showing a result of a simulation of boundary areas in different viewpoints.

The viewpoints 1401 and 1403 are obtained from the reference images 107, and selected to generate the viewpoint 1402. The geometry information 1407 and 1408 are correspondence relationship between pixels in different viewpoints.

Geometry information based on original 3D coordinates may be transformed to correspondence information. The correspondence relationship is a representation for the geometry information. The geometry information generally contains errors around boundaries, which lead to incorrect correspondences.

Boundary areas 1501 and 1502 shown in FIG. 16 are two typical boundary patterns. In the boundary area 1501, a background is in left side and a foreground is in right side. In the boundary area 1502, the foreground is in left side and the background is in right side.

Pixels 1503 and 1506 are boundary areas in the viewpoint 1401 (reference viewpoint). Pixels 1504 and 1507 are boundary areas in the viewpoint 1402 (virtual viewpoint). Pixels 1505 and 1508 are boundary areas in the viewpoint 1403 (reference viewpoint).

Geometry information in FIG. 16 is represented as correspondence of each pixel and assumed to be perfect with no errors. Actually, however, as shown in FIG. 17, the geometry information does not always enable sound correspondence without errors.

Figure 17:
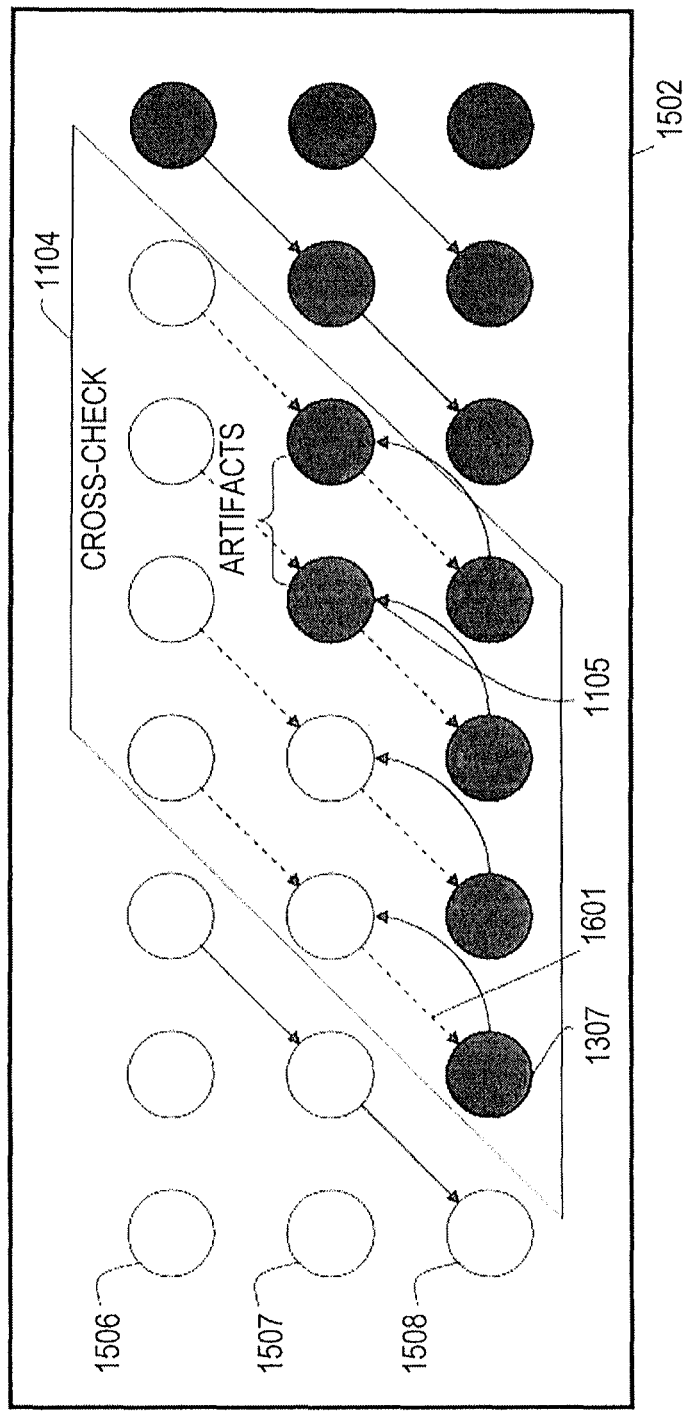
FIG. 17 is an explanatory diagram in a case where a boundary is simulated with imperfect geometry information in synthesis error approximation.

FIG. 17 is an explanatory diagram showing a boundary simulated with imperfect geometry information in synthesis error approximation.

Without loss of generality, the boundary area 1502 is cross-checked by the reference cross-check section 1104 to infer potential synthesis errors caused by imperfect geometry information 1601.

In the synthesis error approximation section 1105, potential synthesis errors at a virtual viewpoint may be approximated by properly projecting cross-check errors 1307 to the virtual viewpoint. The cross-check errors 1307 are errors obtained in the reference cross-check processing of S135 performed in the reference cross-check section 1104.

The potential synthesis errors described herein have been efficiently approximated and are to be utilized to compute reliability information in a reliability computation section 1106.

For each reference $R_i$ (i=1, 2 . . . N) with respect to each virtual viewpoint, a unique approximation error map $e_i$ is generated in the synthesis error approximation section 1105. One pixel p in the error map $e_i$ is $e_{ip}$.

Then, a reliability $r_{ip}$ for a virtual pixel p with reference $R_i$ is defined as: $r_{ip} = f(e_{ip})$. f is a decreasing function with respect to $e_{ip}$, which means that reliability is inverse proportional to the potential synthesis errors.

A form of function f is dependent on a statistical distribution of the potential synthesis errors. If the warped reference $R_i$ is denoted as $I_i$, then obviously f, $I_i$, and $e_i$ have a measurement relationship: $f = I_i + e_i$. If $e_{ip}$ is per-pixel Gaussian with zero mean and variance $\sigma_{ip}^2$, the reliability is generated by maximizing a likelihood of f using Bayesian inference as shown in a following Equation 9.

[Equation 9]

$$P_{Likelihood}(f) = P(I_i | f, \sigma_i) P(\sigma_i) = \prod_P \frac{1}{\sqrt{2\pi\sigma_{ip}^2}} \exp\left(-\frac{e_{ip}^2}{2\sigma_k^2}\right) * \prod_P \Gamma\left(\frac{1}{\sigma_{ip}^2}\alpha, \beta\right) \quad (9)$$

wherein P is a pixel set of whole image and $\alpha,\beta$ are hyper-parameters in $\Gamma$ distribution. Maximizing the likelihood probability is equivalent to minimizing a likelihood energy which is a negative logarithm in a case where the probability is represented by following Equations 10 and 11.

[Equation 10]

$$E_{likelihood} = \sum \left(\left(\frac{e_\varphi^2}{2} + \beta\right)\frac{1}{\sigma_{ip}^2} + (2\alpha - 1)\ln\sigma_{ip}\right) \quad (10)$$

[Equation 11]

$$\sigma_{ip}^2 = \min_{\sigma_{ip}} E_{Likelihood} = \frac{e_{ip}^2 + 2\beta}{2\alpha - 1} \quad (11)$$

The likelihood energy with respect to the synthesized view f is essentially represented by a following Equation 12.

[Equation 12]

$$E_{likelihood}(f) = \sum_P \frac{1}{2\sigma_{ip}^2}(f_p - I_{ip})^2 \quad (12)$$

Thus, the reliability is defined by a following Equation 13.

[Equation 13]

$$r_{ip} = \frac{1}{2\sigma_{ip}^2} = \frac{a}{e_{ip}^2 - b}, (a = \alpha - 0.5, b = 2\beta) \quad (13)$$

Final reliability computation is an equation as: $r_{ip} = a/(e_{ip}*e_{ip}+b)$, wherein a and b are user parameters which can be used to tune reliability influence. Reliability with non-Gaussian synthesis errors may be defined similarly.

Using the above reliability definition, the reliability computation section 1106 generates a unique reliability value $r_{ip}$ for each reference pixel with respect to the virtual viewpoint. Reliability information 1113 is spatially varying for each reference with each virtual viewpoint. Binary reliability can be formulated as: $r_{ip}=0$ ($e_{ip}$>threshold) and $r_{ip}=1$ ($e_{ip}\leq$threshold). A threshold for a synthesis error is set to be a significant intensity difference value.

The view synthesis block 1102 provides two versions of reliability-based view synthesis solutions, using the reference images 107, the geometry information 108, the virtual cameras information 1112, and the reliability information 1113.

Figure 18:
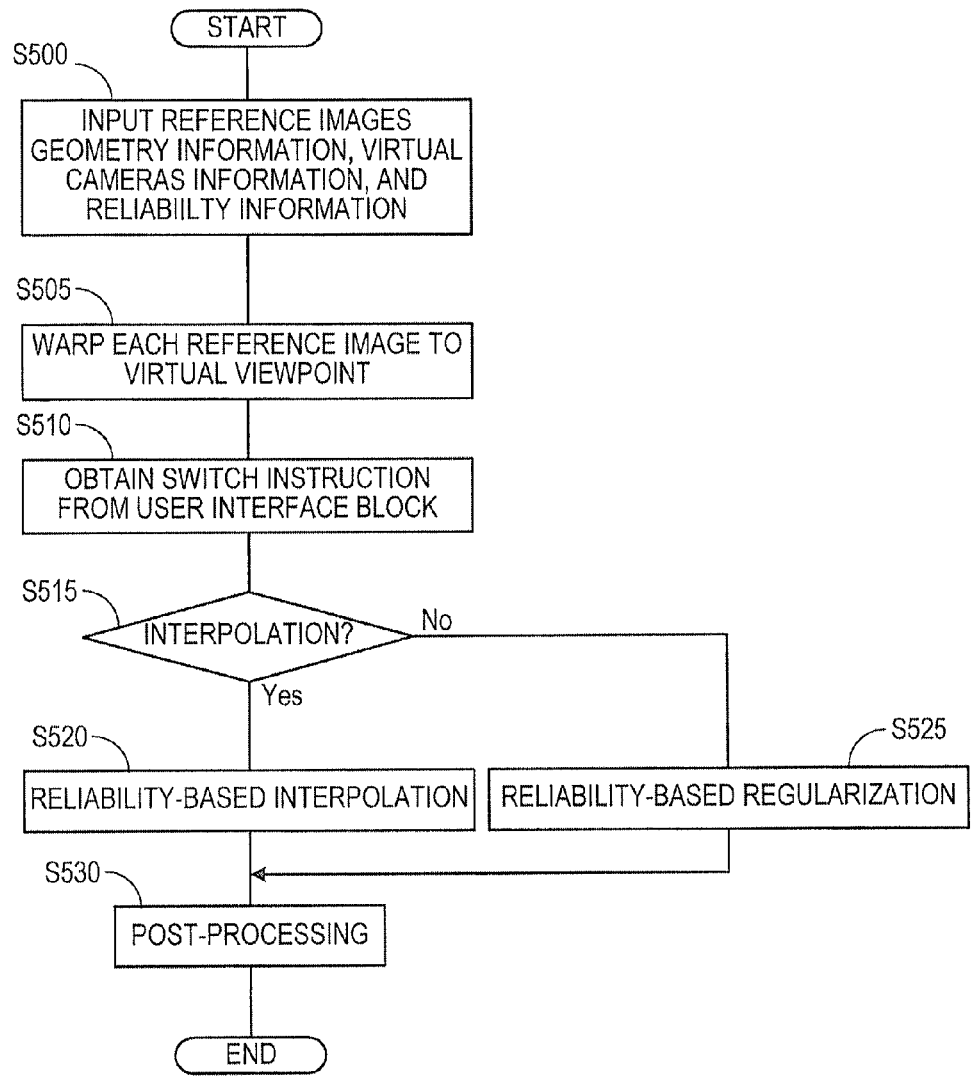
FIG. 18 is a flowchart showing a flow of view synthesis processing.

Here, a description will be given as to a view synthesizing processing performed in the view synthesis block 1102 with reference to FIG. 18. FIG. 18 is a flowchart showing a flow of the view synthesis processing.

As shown in FIG. 18, in the view synthesis processing, the reference images 107, the geometry information 108, the virtual cameras information 1112, and the reliability information 1113 are first obtained in a step S500.

In a following step S505, each of the reference images 107 is warped to the virtual viewpoint based on the reference images 107, the geometry information 108, the virtual cameras information 1112, and the reliability information 1113 obtained in S500.

In other words, in S505, each reference $R_i$ is warped to the virtual viewpoint as $I_i$ for final view synthesis.

In a following step S510, a switch instruction is obtained from the user interface block 1103.

In a following step S515, it is determined whether the process proceeds to a "reliability-based interpolation (corresponding to a reliability-based interpolation section 1107 in FIG. 12)" or to a "reliability-based regularization (corresponding to a reliability-based regularization section 1108 in FIG. 12)" in accordance with the switch instruction obtained in S510 from the user interface block 1103 (either by user application requirements or automatic application requirements).

If the switch instruction is the reliability-based interpolation (S515: Yes), the process proceeds to a step S520, and if the switch instruction is the reliability-based regularization (S515: No), the process proceeds to a step S525.

A solution of the reliability-based interpolation in S520 can reduce both a foreground artifact and a background artifact efficiently. While subjective quality is significantly improved, objective quality is also improved. Synthesized color intensity $f_p$ of the pixel p in the virtual viewpoint is represented by a following Equation 14.

[Equation 14]

$$f_p = \frac{\sum_{i=1}^{N}(r_{ip}I_{ip})}{\sum_{i=1}^{N}r_{ip}} \quad (14)$$

A solution of the reliability-based regularization in S525 can regularize a residual synthesis noise via Markov Random Field. Both subjective quality and objective quality of virtual views are significantly improved. This generates a virtual view f with extremely high quality. The synthesized f is generated by following Equations 15 and 16.

[Equation 15]

$$f = M_f inE \quad (15)$$

[Equation 16]

$$E = \sum_{i=1}^{N}\sum_{p \in P} r_{ip}(f_p - I_{ip})^2 + \sum_{p \in P}|f_p - f_q| \quad (16)$$

wherein P is a whole pixel set of the virtual view and q is a pixel, which is neighboring to a pixel p. This neighborhood-based regularization suppresses artifacts as well as residual noises. A regularization term can be further replaced by any reasonable prior terms. Modern optimization techniques (Graph cuts, Belief propagation, Dynamic programming etc.) may be employed to solve energy minimization.

In a step S530, a post-processing is performed. The post-processing can further improve the synthesis quality efficiently by incorporating hybrid solutions between previous solutions in the "reliability-based interpolation" in S520 and the "reliability-based generalization" in S525.

Outputs obtained by the post-processing in S530 are virtual views 109.

The virtual views 109 are crucial for applications such as 3DTV, Free-viewpoint TV (FTV), Multi-view video coding and other vision applications (virtual reality, virtual navigation, image-based rendering etc.).

Figure 19:
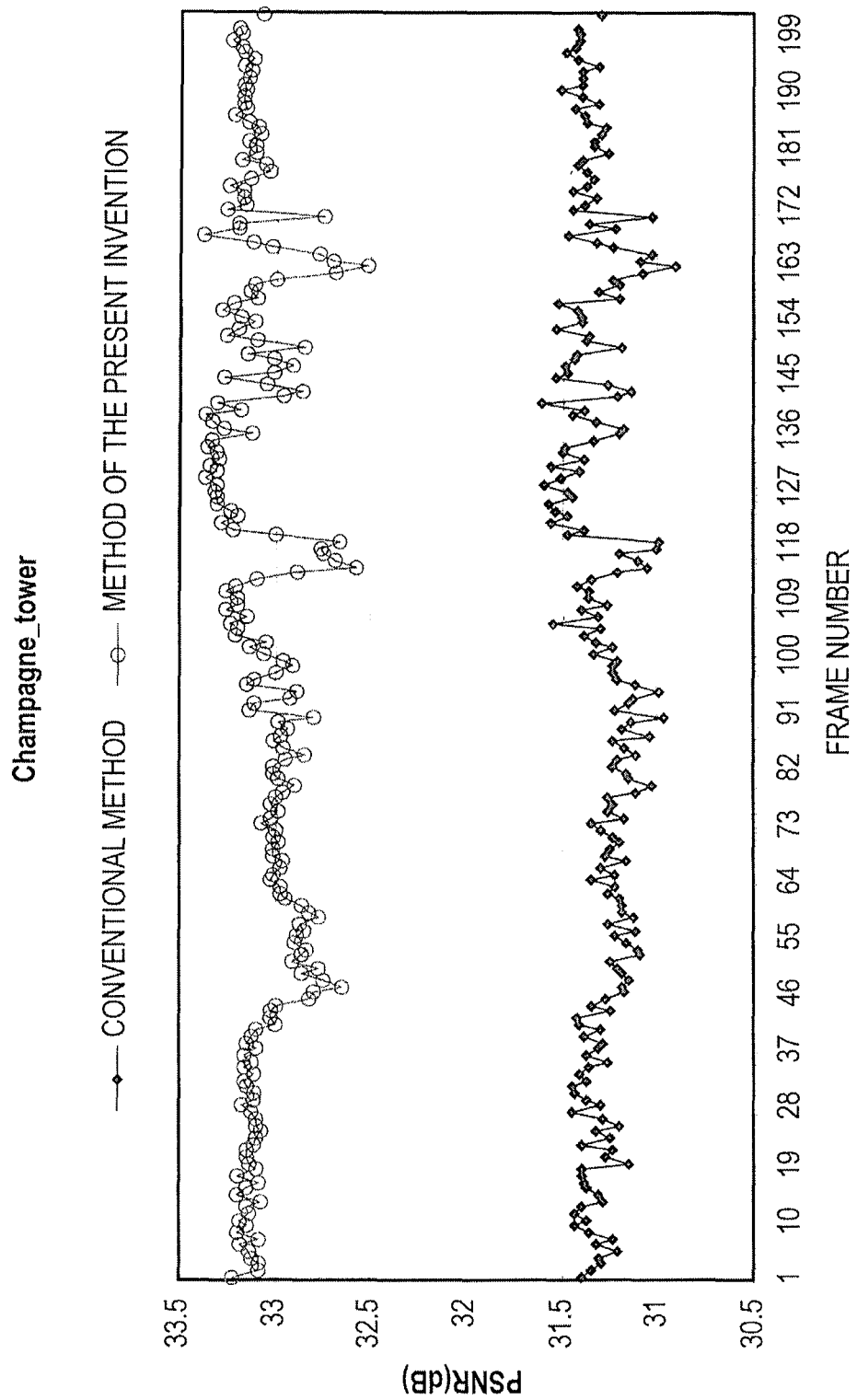
FIG. 19 is a PSNR comparison on video sequence "Champagne_tower" between a conventional method and a method of the present invention.

FIG. 19 is a diagram showing a PSNR comparison on a video sequence "Champagne_tower" between a conventional method and the method of the present invention. In FIG. 19, the conventional PSNR is shown with black square dots and the PSNR of the present invention is shown with white round dots.

As shown in FIG. 19, according to the method of the present invention, PSNR is improved by approximately 1.75 dB from around 31.25 dB to around 33 dB, compared to the conventional method.

[Other Embodiments]

Although the embodiments of the present invention have been hereinabove described, the present invention is not limited to the embodiments but can take various forms.

(1) In the embodiment, the up-sampling subsystem 41 is used in the subsequent stage of the transmission/storage subsystem 23. However, the up-sampling subsystem 41 may be used in the stage prior to the transmission/storage subsystem 23 depending on a type of the application.

(2) While the reliability is defined as a function of a potential synthesis error, the reliability may be defined as a function other than that specified in the above embodiment.

(3) Any reliability-based view interpolation may be applied as long as it generates virtual views by weighing each pixel via normalized spatially varying reliabilities.

(4) Any reliability-based regularization may be applied as long as it incorporates reliabilities into an energy function which can be solved by various global optimization techniques (Graph cuts, Belief propagation, Dynamic programming etc.).

What is claimed is:

1. A virtual viewpoint image synthesizing method in which a virtual viewpoint image viewed from a virtual viewpoint is synthesized based on image information obtained from a plurality of viewpoints, the method comprising:
a reference images obtaining step of obtaining reference images, which become references for the virtual viewpoint image, from a plurality of image obtaining devices disposed at the plurality of viewpoints;
a depth maps generating step of generating depth maps of images at the viewpoints at which the plurality of image obtaining devices are disposed by an image depths obtaining device that obtains depths of the images at the viewpoints at which the plurality of image obtaining devices are disposed;
an up-sampling step of up-sampling the depth maps generated in the depth maps generating step, and the up-sampling step comprising the steps of:
inputting the depth map input from a depth camera;
associating a set of neighboring pixels in the depth map generated in the depth maps generating step with pixels not neighboring each other in the reference image;
assigning a weight to each pixel in the set of neighboring pixels in the depth map;
optimizing the weight assigned to each pixel in the set of neighboring pixels;
calculating a minimum weight; and
selecting an optimal depth value for the set of neighboring pixels;
a virtual viewpoint information obtaining step of obtaining location information and direction information of the virtual viewpoint from a virtual viewpoint information obtaining device, which obtains the location information and the direction information of the virtual viewpoint, the direction information including a direction in which the synthesized image is viewed from the virtual viewpoint; and
a virtual viewpoint image synthesizing step of synthesizing the virtual viewpoint image, which corresponds to the location information and the direction information of the virtual viewpoint obtained in the virtual viewpoint information obtaining step, based on the reference images obtained in the reference images obtaining step, the depth maps up-sampled in the up-sampling step, and the location information and the direction information.

2. The virtual viewpoint image synthesizing method according to claim 1, wherein the image depths obtaining device is the depth camera that detects a depth of an image.

3. The virtual viewpoint image synthesizing method according to claim 1, wherein the weight is assigned based on color or intensity differences and distances between a pixel of the reference image and the set of neighboring pixels in the depth map.

4. The virtual viewpoint image synthesizing method according to claim 1, wherein the weight is assigned based on a combination of color or intensity differences and distances between a pixel of the depth map input from the depth camera and/or the reference image, and the set of neighboring pixels in the depth map input from the depth camera and/or the reference image.

5. The virtual viewpoint image synthesizing method according to claim 1, wherein optimization of the weight is performed by a winner-takes-all selection.

6. The virtual viewpoint image synthesizing method according to claim 1, wherein selection of the optimal depth value is performed by selecting a depth of a pixel with a lowest weight as an output depth value.

7. A virtual viewpoint image synthesizing system in which a virtual viewpoint image viewed from a virtual viewpoint is synthesized based on image information obtained from a plurality of viewpoints, the system comprising:
a plurality of image obtaining devices disposed at the plurality of viewpoints;
a reference images obtaining device that obtains reference images, which become references for image construction, from the plurality of image obtaining devices;
an image depths obtaining device that obtains depths of images at the viewpoints at which the plurality of image obtaining devices are disposed;
a depth maps generating device that generates depth maps of the images at the viewpoints at which the plurality of image obtaining devices are disposed based on the depths obtained by the image depths obtaining device;
an up-sampling device that up-samples the depth maps generated by the depth maps generating device, the up-sampling device comprising:
a depth map inputting device that inputs the depth map input;
an associating device that associates a set of neighboring pixels in the depth map input by the depth map inputting device with pixels not neighboring each other in the reference image;
a weight assigning device that assigns a weight to each pixel in the set of neighboring pixels in the depth map;
a minimum weight calculating device that optimizes the weight assigned to each pixel in the set of neighboring pixels by the weight assigning device and calculates a minimum weight; and
an optimal depth value selecting device that selects an optimal depth value in the set of neighboring pixels;
a virtual viewpoint information obtaining device that obtains location information and direction information of the virtual viewpoint, the direction information including a direction in which the synthesized image is viewed from the virtual viewpoint; and
a virtual viewpoint image synthesizing device that synthesizes the virtual viewpoint image, which corresponds to the location information and the direction information of the virtual viewpoint obtained by the virtual viewpoint information obtaining device based on the reference images obtained by the reference images obtaining device, the depth maps up-sampled by the up-sampling device, and the location information and the direction information.

8. The virtual viewpoint image synthesizing system according to claim 7, wherein the image depths obtaining device is a depth camera that detects a depth of an image.

9. The virtual viewpoint image synthesizing system according to claim 7, wherein the weight assigning device assigns the weight based on color or intensity differences and distances between a pixel of the reference image and the set of neighboring pixels in the depth map input by the depth map inputting device.

10. The virtual viewpoint image synthesizing system according to claim 7, wherein the weight assigning device assigns the weight based on a combination of color or intensity differences and distances between a pixel of the depth map input by the depth map inputting device and/or the reference image, and the set of neighboring pixels in the depth map input by the depth map inputting device and/or the reference image.

11. The virtual viewpoint image synthesizing system according to claim 7, wherein the minimum weight calculating device optimizes the weight by a winner-takes-all selection.

12. The virtual viewpoint image synthesizing system according to claim 7, wherein the optimal depth value selecting device selects a depth of a pixel with a lowest weight as an output depth value.

13. A virtual viewpoint image synthesizing method in which a virtual viewpoint image viewed from a virtual viewpoint is synthesized based on image information obtained from a plurality of viewpoints, the method comprising:
a reference images obtaining step of obtaining reference images, which become references for the virtual viewpoint image, from a plurality of image obtaining devices disposed at the plurality of viewpoints;
a depth maps generating step of generating depth maps of images at the viewpoints at which the plurality of image obtaining devices are disposed by means of an image depths obtaining device that obtains depths of the images at the viewpoints at which the plurality of image obtaining devices are disposed;
a down-sampling step of obtaining only depth values of predetermined pixels from the depth maps generated in the depth maps generating step, and storing depth maps having the depth values as down-sampled depth maps;
an up-sampling step of up-sampling the down-sampled depth maps generated in the down-sampling step, and the up-sampling step comprising the steps of:
inputting the depth map input from a depth camera;
associating a set of neighboring pixels in the depth map generated in the depth maps generating step with pixels not neighboring each other in the reference image;
assigning a weight to each pixel in the set of neighboring pixels in the depth map;
optimizing the weight assigned to each pixel in the set of neighboring pixels;
calculating a minimum weight; and
selecting an optimal depth value in the set of neighboring pixels;
a virtual viewpoint information obtaining step of obtaining location information and direction information of the virtual viewpoint from a virtual viewpoint information obtaining device, which obtains the location information and the direction information of the virtual viewpoint, the direction information including a direction in which the synthesized image is viewed from the virtual viewpoint; and a virtual viewpoint image synthesizing step of synthesizing the virtual viewpoint image, which corresponds to the location information and the direction information of the virtual viewpoint obtained in the virtual viewpoint information obtaining step, based on the reference images obtained in the reference images obtaining step, the depth maps up-sampled in the up-sampling step, and the location information and the direction information.

14. The virtual viewpoint image synthesizing method according to claim 13, wherein the weight is assigned based on color or intensity differences and distances between a pixel of the reference image and the set of neighboring pixels in the depth map.

15. The virtual viewpoint image synthesizing method according to claim 13, wherein the weight is assigned based on a combination of color or intensity differences and distances between a pixel of the depth map input from the depth camera and/or the reference image, and the set of neighboring pixels in the depth map input from the depth camera and/or the reference image.

16. The virtual viewpoint image synthesizing method according to claim 13, wherein optimization of the weight is performed by a winner-takes-all selection.

17. The virtual viewpoint image synthesizing method according to claim 13, wherein selection of the optimal depth value is performed by selecting a depth of a pixel with a lowest weight as an output depth value.

* * * * *